United States Patent
Zilliacus et al.

(10) Patent No.: US 6,915,272 B1
(45) Date of Patent: Jul. 5, 2005

(54) SYSTEM AND METHOD OF SECURE PAYMENT AND DELIVERY OF GOODS AND SERVICES

(75) Inventors: Martin Zilliacus, Kauniainen (FI); Philip Ginzboorg, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/511,237

(22) Filed: Feb. 23, 2000

(51) Int. Cl.[7] .......................... G06F 17/60; G06F 13/00; G06F 15/16
(52) U.S. Cl. ............................. 705/26; 705/27; 705/40; 707/4; 707/3; 707/10; 707/104; 707/501; 707/513; 380/23; 380/24
(58) Field of Search ............................. 705/26, 27, 40, 705/79, 44

(56) References Cited

U.S. PATENT DOCUMENTS

| | | | |
|---|---|---|---|
| 5,241,599 A | | 8/1993 | Bellovin et al. |
| 5,440,635 A | | 8/1995 | Bellovin et al. |
| 5,661,806 A | | 8/1997 | Nevoux et al. |
| 5,671,279 A | * | 9/1997 | Elgamal ........................ 705/79 |
| 5,729,537 A | | 3/1998 | Billstrom |
| 5,732,074 A | * | 3/1998 | Spaur et al. ................. 370/313 |
| 5,794,221 A | * | 8/1998 | Egendorf ....................... 705/40 |
| 5,802,497 A | | 9/1998 | Manasse |
| 5,809,144 A | | 9/1998 | Sirbu et al. |
| 5,815,665 A | * | 9/1998 | Teper et al. .................... 705/26 |
| 5,897,622 A | * | 4/1999 | Blinn et al. .................... 705/26 |
| 5,903,878 A | * | 5/1999 | Talati et al. .................... 705/26 |
| 5,991,407 A | * | 11/1999 | Murto .......................... 380/248 |
| 6,029,151 A | * | 2/2000 | Nikander ....................... 380/33 |
| 6,134,548 A | * | 10/2000 | Gottsman et al. ............... 707/5 |
| 6,401,085 B1 | * | 6/2002 | Gershman et al. ............. 707/4 |

FOREIGN PATENT DOCUMENTS

| | | | |
|---|---|---|---|
| EP | 0544460 | 6/1993 | |
| EP | 883313 A2 * | 12/1998 | ............. H04Q/7/22 |
| EP | 890907 A1 * | 1/1999 | ............ G06F/17/30 |
| EP | 0944203 | 9/1999 | |
| WO | 9844402 | 10/1998 | |
| WO | 9957689 | 11/1999 | |

OTHER PUBLICATIONS

Sirbu, Marvin; J.D.; Sirbu Marvin; "NetBill Security and Transaction Protocol" Jul., 1995.*

(Continued)

*Primary Examiner*—James P. Trammell
*Assistant Examiner*—Daniel L. Greene
(74) *Attorney, Agent, or Firm*—Antonelli, Terry, Stout & Kraus, LLP

(57) ABSTRACT

A system, method and computer program for ordering, paying for and delivering goods and services from a content provider to a user which assures the content provider that he will be paid and that assures the user that he will receive the content at an agreed upon price. Thus, this system, method and computer program facilitates business transactions occurring between parties who do not know each other by using a trusted third party to either take the user's order, deliver to the user's order, and/or bill the user the correct amount for the goods and services contracted for. This system, method and computer program relies on the Global System for Mobile (GSM) communications system to authenticate the user and provide algorithms and modules that are used to generate cipher keys and service responses so as to insure the content provider will be paid and that the user will not be overcharged. Further, these algorithms and modules are used to encrypt important information so as to prevent third parties from intercepting this important information. Five business model modules are detailed with numerous variations possible to accomplish the task of facilitating business transactions between parties that do not necessarily know or trust each other.

120 Claims, 15 Drawing Sheets

OTHER PUBLICATIONS

R. Sellin, "Neue Mobile Perspektiven Mit WAP", vol. 52, No. 11, 1999 p. 52, col. 1, lines 8–13 (English translation).

Transport Layer Security Working Group, "The SSL Protocol Version 3.0", Freier et al., http://home.netscape.com/eng/ssl3/draft302.txt, pp. 1–62, Feb. 8, 2000.

"Handbook of Applied Cryptography", Menezes et al., pp. 345–, 347–349, 1997.

"The GSM System of Mobile Communications", Mouly et al., Cell & Sys, pp. 477–498, 1992.

"Digital Cellular Telecommunications System (Phase 2+)", ETSI TS 100 929 V6.1.0., pp. 1–71, 1997.

"CyberCash Payment Types", CyberCash, http://www.cybercash.com/cybercash/services/, Jan. 6, 2000.

"InstaBuy", InstaBuy Home, http://www.instabuy.com/, Jan. 6, 2000.

* cited by examiner

SYSTEM AND METHOD OF SECURE PAYMENT AND DELIVERY OF GOODS AND SERVICES

FIELD OF THE INVENTION

The invention relates to a system and method for the secure payment and delivery of goods and services. More particularly, the invention is a system and method in which two or more parties, who have not engaged in any prior business transactions, may order goods and services from each other and arrange for payment and delivery through a trusted third party.

BACKGROUND OF THE INVENTION

With the explosion in Internet access and usage an increasing volume of business is occurring between individuals and firms, who have never seen each other, let alone engaged in any prior business transactions. Currently, a typical Internet user would have a browser installed in his local computer or server such as Internet Explorer™ or Netscape™. Using this browser, the user would access an Internet service provider, such as America-On-Line (AOL™), via a modem over the local public switched telephone network (PSTN). Once logged onto the Internet server, the user may utilize one of the many search engines, such as Yahoo™ or Lycos™, to specify search terms. The user may also use a web crawler, spider or robot to attempt to find a product, service or information desired. The search engine or web crawler would then respond with a list of web sites which matched the search terms the user provided. The user would then log onto a web site and view the products or services available for sale. If the user decides to buy the item from the web site, the firm operating the web site would frequently request a credit card number be entered by the user in order to pay for the product or service. Once the credit card charge is approved, the operator of the web site will then typically ship the item to the user. In the case where the item ordered is digital in format, such as software, graphics, text, video, or music, the item ordered maybe downloaded into the user's PC, server, lap top, palm computer or other processor-based system.

With the advent of cellular phones with and without wireless access protocol (WAP), a user may also "surf" the Internet and order goods and services directly through the WAP-capable phone or a processor-based system connected to the cellular phone in a similar manner as that used with a PC. Thus, a user may order goods and services from anywhere a cellular phone, satellite phone, or other type of mobile phone may operate. Therefore, a person could be sitting in the middle of a remote area, many miles away from another human being, let alone a telephone line, and order a video game from a web site on the other side of the planet and download it into his palm computer connected to a cellular or a standalone WAP or HTML (Hypertext Markup Language) capable phone and play the game on the spot.

However, the user or consumer may not know who is operating the web site and may have a legitimate fear of supplying a credit card number over the Internet to a stranger who may or may not deliver the desired product. Further, the user may be concerned that the agreed upon price will not be the price actually charged to his credit card. Also, there is no guarantee that the goods will be delivered if the web site operator is less than honest. Further, if the user is contacting the web site through a WAP-capable phone or processor connected to a mobile phone, the user may desire the digital product to be sent to another computer at a later time rather than downloaded to or through the mobile phone since such a digital product may be a large file and take a long time to download, which can be expensive because of the long access time.

Attempts to alleviate the foregoing problems and facilitate Internet commerce have been made by CyberCash, Inc. using CyberCoin™, CyberCash™, and InstaBuy™. CyberCoin™ enables a user or consumer to establish an account to be used in making small purchases ranging typically anywhere from 25 cents to ten dollars. A user of CyberCoin™ makes deposits to his account using a major credit card, such as for example Visa™ or MasterCard™, in small amounts. When making purchases, the user pays for the purchase with the CyberCoin™ account. Since, the purchases using CyberCoin™ involve a small amount of money and the web site operator does not receive an account number for a major credit card, the risk to the user is reduced. However, there is no guarantee of delivery of the product bought or that the correct amount will be charged to the CyberCoin™ account. Also, in the case of digital products, no provision is made for later delivery to an alternate computer system. Further, even though the amount of money in a CyberCoin™ is small, the risk of intercepting such an account number by a third party still exists even when an encryption algorithm is employed.

CyberCash™ is a service which offers a web site a more secure method of processing credit card purchases by linking the web site to the credit card processor using an encryption algorithm. This reduces, but does not eliminate, the risk to the user or consumer that a third party will intercept the credit card number since that number and authorization is encrypted. However, again the consumer is not guaranteed delivery of the product ordered or that the correct amount will be charged to the credit card. Also, in the case of digital products, no provision is made for later delivery to an alternate computer system.

InstaBuy™ is a mechanism in which a consumer may establish a password protected file of credit card numbers and other information. When making a purchase from a web site that is signed up for this service, the consumer enters the password and selects from the credit cards listed in his file to make the payment. Again, the transaction is encrypted to reduce, but not eliminate, the risk that a third party will intercept the credit card number. Further, since the required credit card number is entered once, the consumer does not have to enter it for every purchase. However, again the consumer is not guaranteed delivery of the product ordered or that the correct amount will be charged to the credit card. Also, in the case of digital products, no provision is made for later delivery to an alternate computer system.

Therefore, what is needed are a system and method for a user or consumer to order and pay for goods and services without the risk of a third party intercepting a credit card number or other method of payment. This system and method should also provide a mechanism for the user or consumer to pay for a product without supplying a credit card number, or other method of payment, to the content provider, but instead pays a trusted party. Further, this system and method should also lock or bind the seller of goods and services to a price which the user or consumer was initially given and thereby prevent the seller from charging a different price. This system and method should also provide a mechanism in which the consumer may be confident of actually receiving the ordered item. Still further, this system and method should be able to have the purchased digital item delivered to a location other than the location at which the order was placed and at a time the user requests the delivery.

SUMMARY OF THE INVENTION

An embodiment of the present invention provides a system, method and computer program for ordering, paying for and delivering goods and services. This system, method and computer program begins by a user ordering and paying for a content selected from a content provider. The user then calculates and transmits a first service response value to the content provider. Thereafter, the network operator calculates a second service response value when the user requests the content from the network operator. The network operator contacts the content provider to verify that first service response value matches the second service response value. The network operator then transmits the content to the user when the first service response value matches the second service response value.

Further, an embodiment of the present invention creates a system, method and computer program for ordering, paying for and delivering goods and services. This system, method and computer program begins by a user ordering a content, having a content ID, selected from a content provider. The content provider then transmits to the network operator a first service response value, and a mobile network identifier received from the user. The network operator then calculates a second service response value and a cipher key and determines if the first service response value matches the second service response value. The content provider transmits the content to the user, when the first service response value matches second service response value.

Still further, an embodiment of the present invention provides for a system, method and computer program for ordering, paying for and delivering goods and services. This system, method and computer program begins by the user ordering a content, having a content ID, selected from a network operator. The user then calculates and transmits a first service response value to the network operator. The network operator calculates a second service response value and a cipher key and determines if the first service response value matches the second service response value. The content ID, and a cipher key are transmitted to the content provider. The content is transmitted to the user by the content provider when requested by the user.

In addition, an embodiment of the present invention provides for a system, method and computer program for ordering, paying for and delivering goods and services. This system, method and computer program begins by the user ordering a content, having a content ID, selected from a network operator. The user then calculates and transmits a first service response value to the network operator. The network operator calculates a second service response value and a cipher key and determines if the first service response value matches the second service response value. The network operator transmits the content to the user when requested by the user.

Also, an embodiment of the present invention provides for a system, method and computer program for ordering, paying for and delivering goods and services. This system, method and computer program enables a user to select several content items from a content provider. The user then calculates and transmits several first service response values to the content provider. A network operator calculates several second service response values when the user requests the content from the network operator. The network operator verifies, by contacting the content provider, that one first service response values matches one of second service response values. The user then receives the content from the network operator when one of the first service response values matches one of the second service response value.

These and other features of this device and method will become more apparent from the following description when taken in connection with the accompanying drawings which show, for purposes of illustration only, examples in accordance with the present invention.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
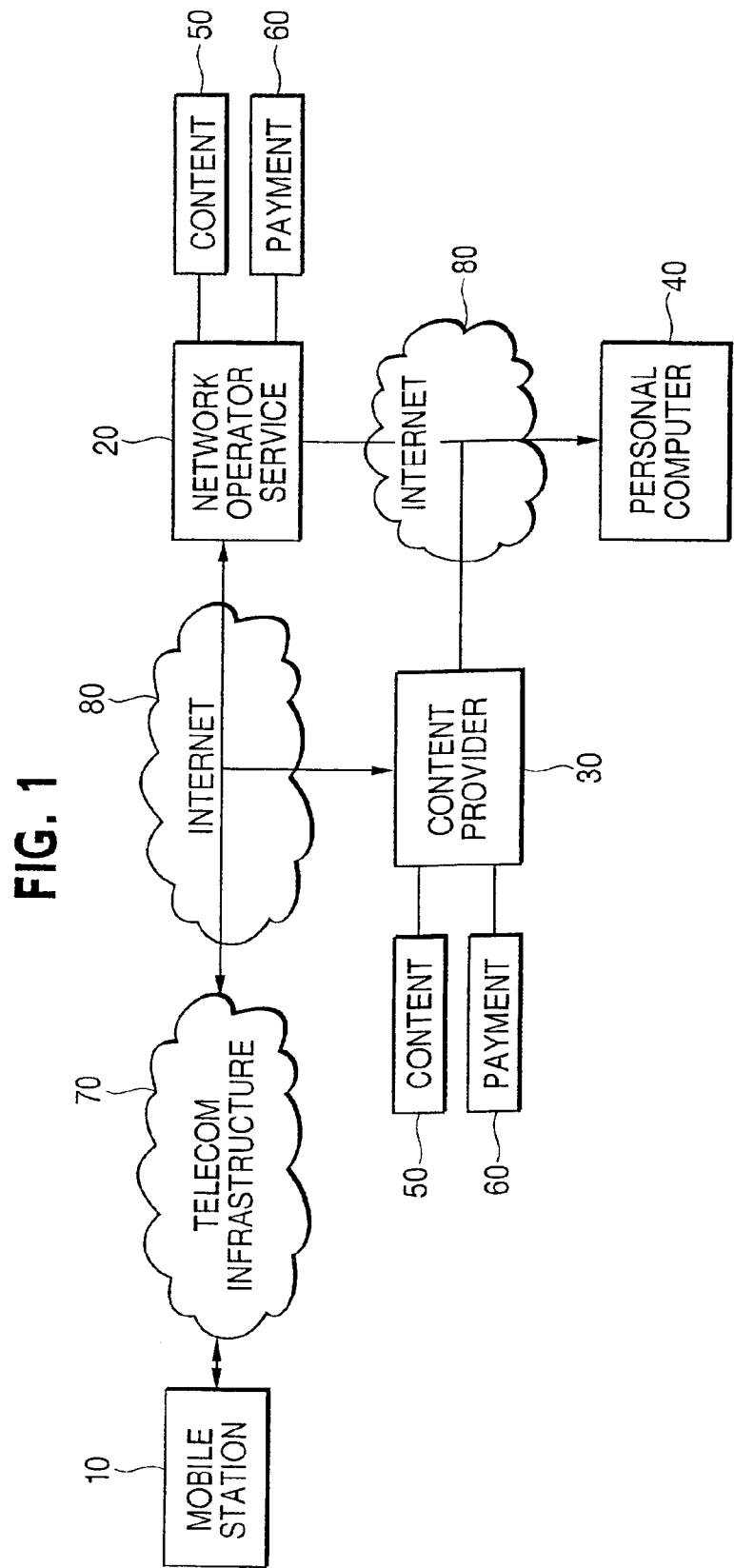
FIG. 1 is an example of an overall system diagram of an embodiment of the present invention.

Before beginning a detailed description of the subject invention, mention of the following is in order. When appropriate, like reference numerals and characters maybe used to designate identical, corresponding or similar components in differing figure drawings. Further, in the detailed description to follow, exemplary sizes/models/values/ranges may be given, although the present invention is not limited to the same.

FIG. 1 illustrates an example of an overall system diagram of an embodiment of the present invention. In this example a mobile station (MS) 10 acts as an interface for the user or consumer (not shown) for access to the present invention. This mobile station (MS) 10 may be a WAP-capable cellular telephone, a Hypertext Markup Language (HTML) capable cellular telephone, or a cellular telephone with a processor-based system connected to it. This processor-based system may be, but not limited to, a laptop computer, palm computer, or other portable computing devices including the WAP-capable telephone alone. The mobile station (MS) 10 communicates through the telecom infrastructure 70 to a network operator 20 or a content provider 30. The interface between the mobile station 10 and the content provider 30 and the network operator 20 may be through, but not limited to, an Internet protocol packet-switched network such as the Internet 80. However, this communications interface may also be a direct communications link provided by the telecom infrastructure 70, such as a cellular telephone network, or a cellular telephone network communicating to a PSTN. Therefore, the embodiments of the present invention are not limited to communications using the Internet.

The user or consumer may also communicate with the embodiments of the present invention through a personal computer (PC) 40. This personal computer may be any processor-based system which may include but not limited to a desk-top PC, a server, a laptop computer, or a palm computer. Further, the PC 40 may communicate to the network operator 20 or the content provider through Internet 80 or directly through the PSTN.

Whether the user or consumer is communicating to the network operator 20 or the content provider 30, the user or consumer may purchase and receive content 50. Content 50 is a product, typically in a digital format which may be, but not limited to, software or data. This software may be, but not limited to, a game, or a business application software. The data may be, but not limited to, a video, music, or information such as stock quotes. As will be discussed in further detail in reference to FIGS. 5 through 13, the content 50 may be provided to the user or consumer by either the network operator 20 or the content provider 30. Further, this content 50 may be delivered to either the mobile station (MS) 10 or the PC 40. In addition, payment 60 may be made by the user or consumer to either the network operator 20 or the content provider 30.

Embodiments of the present invention use the GSM (Global System for Mobile Communications) telephony system that employs algorithms in the mobile station (MS) 10, such as, but not limited to, cellular phones and WAP-capable cellular phones, and the telecom infrastructure 70 which controls authentication of the user to prevent unauthorized access to the network and to provide encryption of the transmissions between users. The GSM System is described in depth in the publication, "The GSM System for Mobile Communications" by Mouly and Pautet, Copyright 1992, which publication is incorporated herein by reference in its entirety. Security features of the GSM system are described in pages 477 through 498 of the Mouly and Pautet text. Further detail of the GSM system security is provided in ETSI publication TS 100 929 V.6.1.0 (1999) entitled "Digital cellular telecommunications system (Phase 2+); Security related network functions" (GSM 03.20 version 6.1.0 Release 1997), which is incorporated herein by reference in its entirety.

Figure 2:
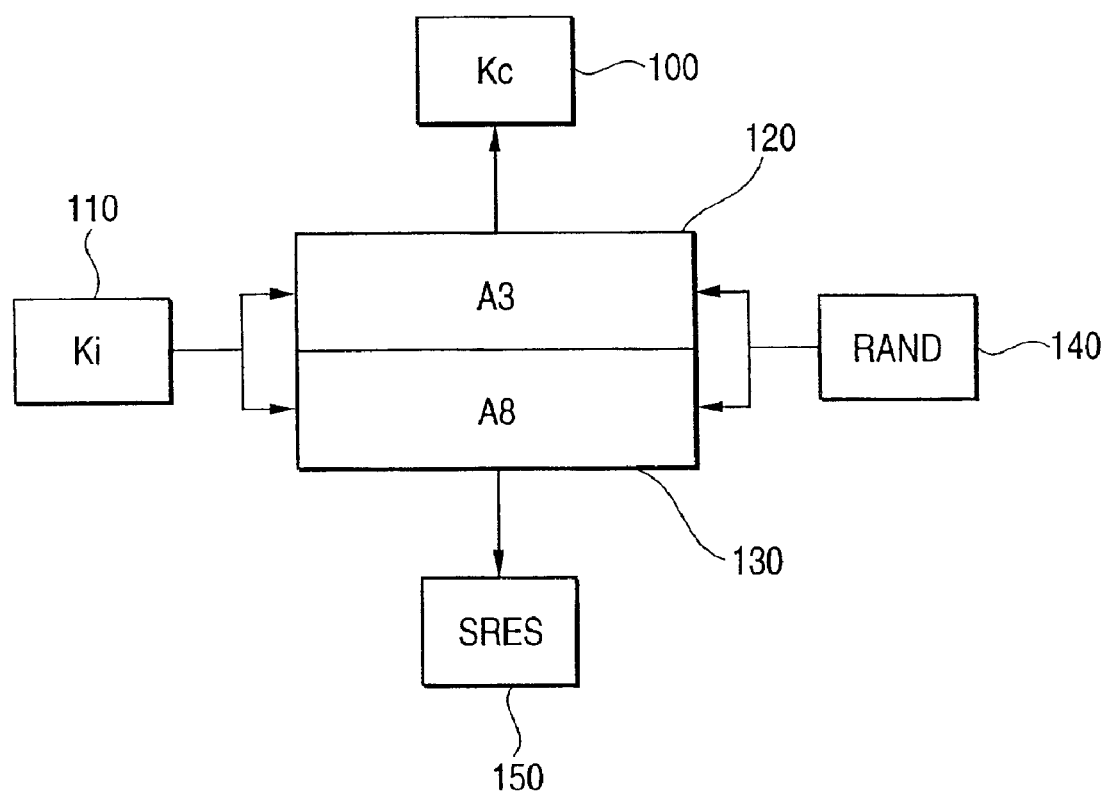
FIG. 2 is diagram showing a Global Standard for Mobile (GSM) communications authentication algorithm used in the example embodiments of the present invention.

Referring to FIG. 2, authentication in a GSM network is performed by the generation of a signed response (SRES) 150 by both the mobile station (MS) 10 and the telecom infrastructure 70 which is a function of a unique secret key (Ki) 110 of the mobile station 10 and a random number (RAND) 150. The signed response (SRES) 150 is calculated in a subscriber identification module (SIM) (not shown) located in the mobile station (MS) 10, based on Ki 110 inside the SIM and RAND 140 obtained from the network authentication center (AuC) (not shown) in the telecom infrastructure 70. Additionally, the mobile station (MS) 10 and the telecom infrastructure 70 each perform encryption by generating a ciphering key (Kc) 100 which is a function of the same random number RAND 140 and the secret key (Ki) 110 of the mobile station 10. This authentication algorithm is a two stage process described in detail ahead in reference to FIG. 3 and FIG. 4 which employs two authentication algorithms. The first authentication algorithm, which calculates SRES 150, is known as the A3 algorithm module 120 and the second algorithm which computes Kc 100, which is computed each time a mobile station is authenticated, is known as the A8 algorithm module 130. However, each of the operations of authentication and computing of the ciphering key (Kc) 110 requires the mobile station (MS) 10 to be programmed to perform the aforementioned computations.

Still referring to FIG. 2, the telecom infrastructure 70 using GSM authenticates the mobile station (MS) 10 whenever a new mobile station (MS) 10 registers with the telecom infrastructure 70 and whenever a registered mobile station (MS) 10 turns on the power. The cryptographic authentication process mentioned above and discussed in further detail in reference to FIGS. 3 and 4, uses the fact that identical computations produce identical results. Authentication in GSM is based on a secret key (Ki) 110 that is shared by telecom infrastructure 70 and the subscriber and which is different for each subscriber. The telecom infrastructure 70 keeps the key Ki 110 in the AuC and the subscriber has Ki 110 installed with SIM card of the mobile station 10, which he receives from the operator when the subscription contract is made. To protect the secrecy of Ki 110, the SIM is made so that the mobile station (MS) 10 cannot directly access the value of Ki 110, and can only initiate certain computations in the SIM that use Ki 10 and then receive the results of those computations. Similarly, the elements of the telecom infrastructure 70, such as home location register (HLR) cannot access subscribers' keys Ki 110 directly. These network elements may only request from the AuC a result of computations that use Ki 110 as discussed above. These computations are an A3 algorithm module 120 and an A8 algorithm module 130 and are identical in the SIM in the mobile station (MS) 10 and in the AuC in the telecom infrastructure 70.

A discussion will now be supplied involving the logic employed in the embodiments of the present invention. Specifically, a discussion will be provided of the flowcharts illustrated in FIGS. 3 through 13 and the modular configuration diagram provided in FIG. 15. The flowcharts shown in FIGS. 3 through 13, as well as the modular configuration diagram shown in FIG. 15 contain operations that correspond, for example, to code, sections of code, instructions, firmware, hardware, commands or the like, of a computer program that is embodied, for example, on a storage medium such as floppy disk, CD Rom, EP Rom, hard disk, etc. Further, the computer program can be written in any language such as, but not limited to, for example C++.

Figure 3:
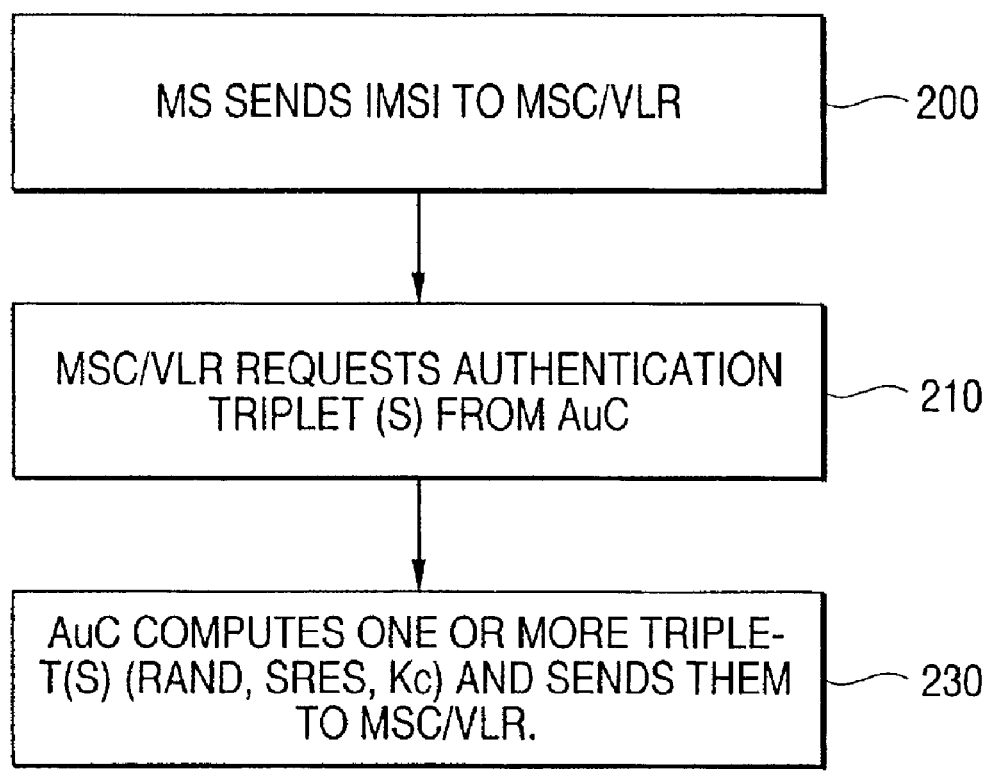
FIG. 3 is a flowchart of a first stage in GSM authentication shown in FIG. 2.
Figure 4:
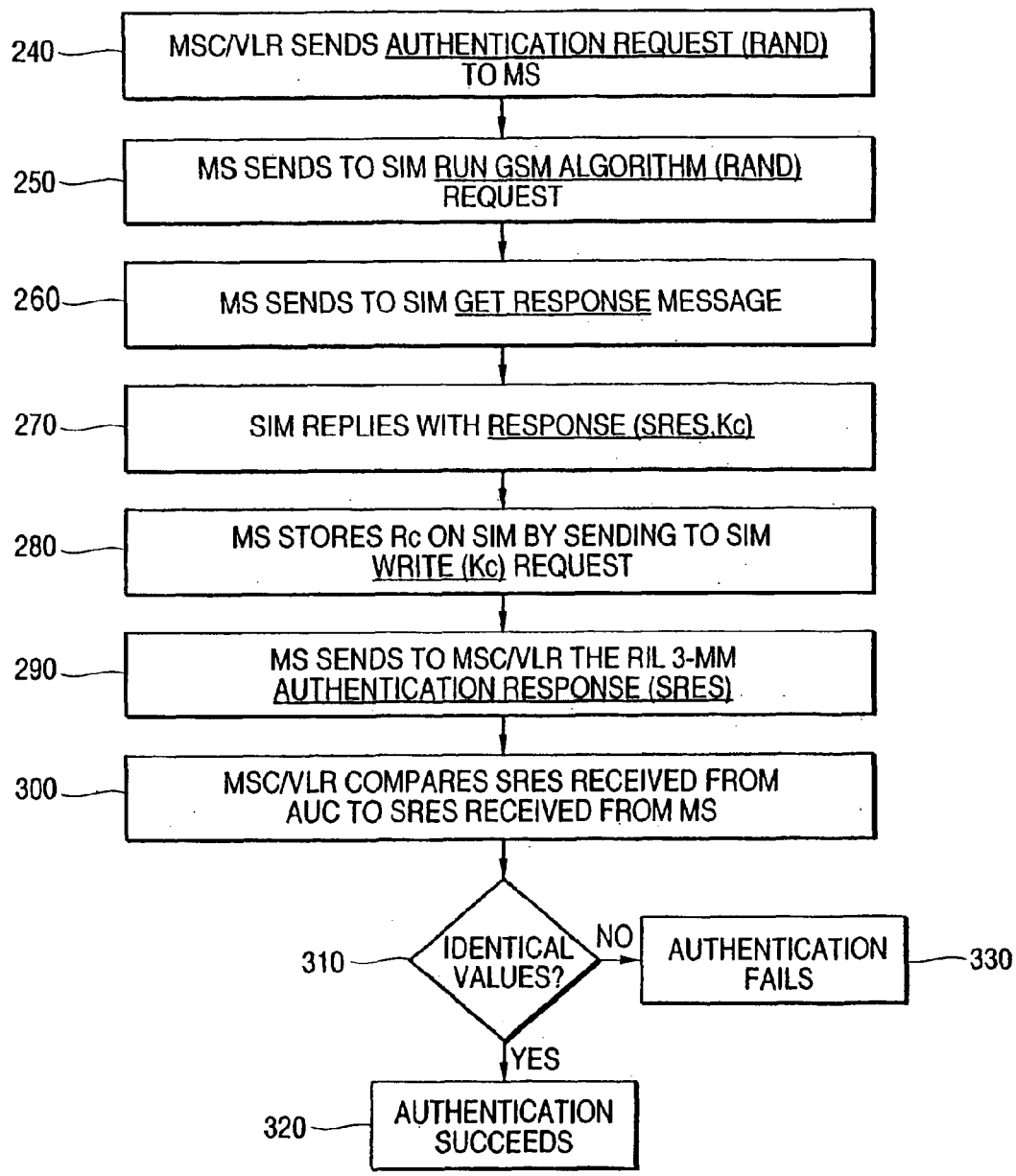
FIG. 4 is a flowchart of a second stage in GSM authentication shown in FIG. 2.
Figure 15:
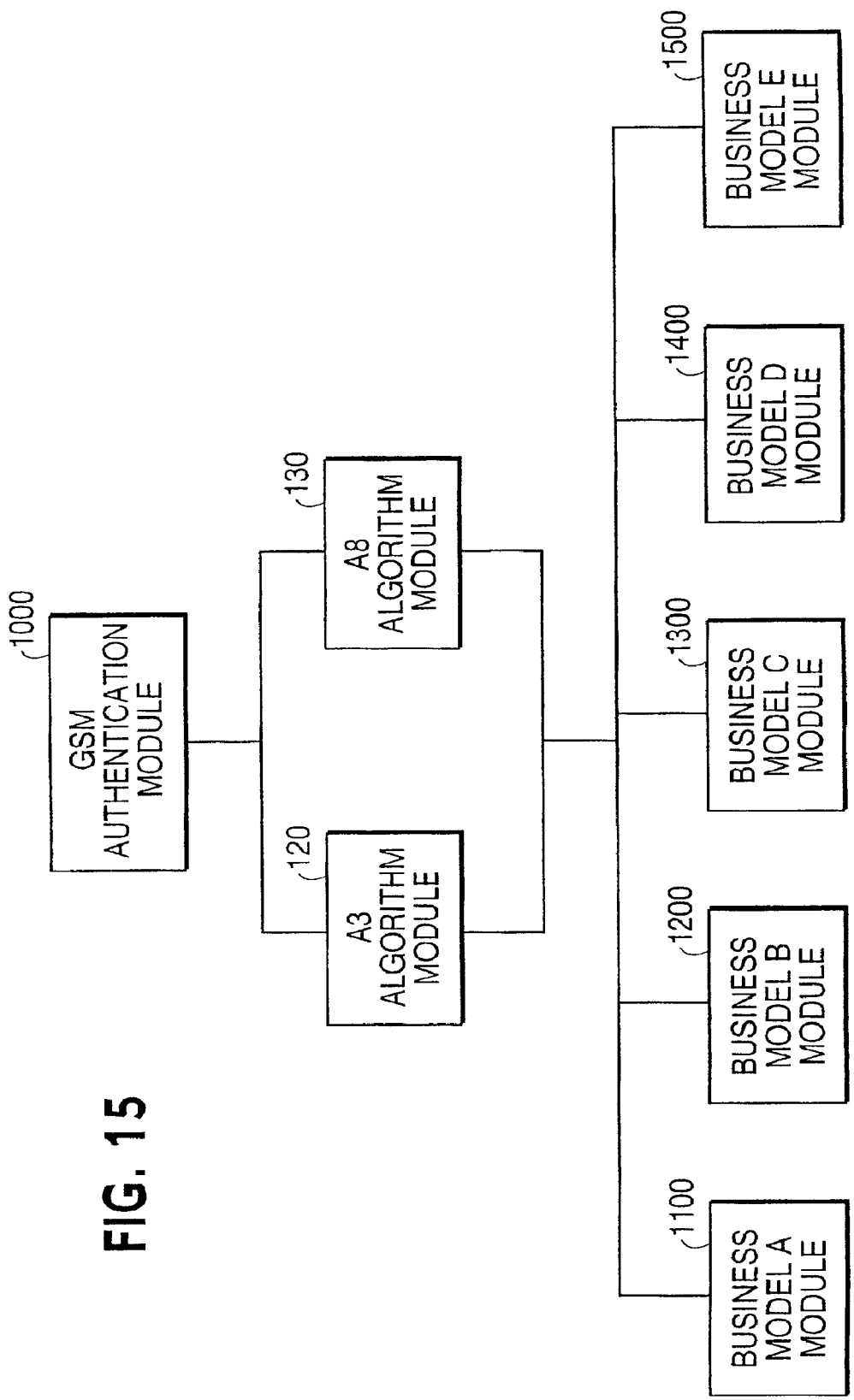
FIG. 15 is a modular configuration diagram of the embodiments of the present invention shown in FIGS. 2 through 13.

The foregoing mentioned GSM authentication process uses a GSM authentication module 1000, shown in FIGS. 2 and 15, which operates in two stages with the first stage being shown in FIG. 3 and the second stage being shown in FIG. 4. The GSM authentication module 1000 includes operations 200 through operation 230 shown in FIG. 3 and operations 240 through 330 shown in FIG. 4.

In the first stage of GSM authentication, shown in FIG. 3, a telecom infrastructure 70 element using GSM authentication module 1000, which is typically a MSC/VLR (Mobile services Switching Center/Visitor Location Register) receives an International Mobile Subscriber Identity (IMSI) from the mobile station (MS) 10 and requests from the AuC of the telecom infrastructure 70 one or more triplets. These triplets are composed of RAND 140, SRES 150, and Kc 100.

Referring to FIG. 3, specifically, in the first stage of GSM authentication the mobile station (MS) 10, in operation 200, sends an International Mobile Subscriber Identity (IMSI) to MSC/VLR in the telecom infrastructure 70. In operation 210, the MSC/VLR requests authentication triplet(s) (RAND 140, SRES 150, and Kc 100) from the AuC in the telecom infrastructure 70. Then in operation 230, the AuC in the telecom infrastructure 70 computes one or more triplets (RAND 140, a SRES 150, and a Kc 100) and sends them to the MSC/VLR in the telecom infrastructure 70.

In the second stage of GSM authentication, the GSM authentication module 1000 starts in operation 240 by the MSC/VLR of the telecom infrastructure 70 authenticating the mobile station (MS) 10 by the MSC/VLR of the telecom infrastructure 70 sending to MS 10 authentication request (RAND) in which the message contains a RAND 140. Then in operation 250, the MS 10 sends to the SIM, contained within MS 10, a run GSM algorithm (RAND) request message which again contains RAND 140. In operation 260, MS 10 sends to the SIM a get response message. Thereafter in operation 270, the SIM replies with a response having a SRES 150 and Kc 100. Then in operation 280, MS 10 stores Kc 100 in the SIM by sending to the SIM a write (Kc) request in which the message contains Kc 100. In operation 290, the MS 10 sends to MSC/VLR a Radio Interface Layer 3, Mobility Management (RIL 3-MM) protocol authentication response in which the SRES 150 is contained in the message. After receiving the message in operation 290, in operation 300 the MSC/VLR, in the telecom infrastructure 70, compares SRES 150 that it has received from AuC, also in the telecom infrastructure 70, in stage one of GSM authentication discussed in reference to FIG. 3, with the SRES 150 received from the MS 10 in operation 310. If the values of the SRES 150 are determined not to be identical in operation 310, then processing proceeds to operation 330 where authentication fails and service is not established. However, if the values are identical in operation 310 then authentication succeeds and service is established in operation 320.

Specific example embodiments of the present invention will now be discussed in reference to FIGS. 5 through 13 and FIG. 15. As would be appreciated by one of ordinary skill in the art, numerous variations to these embodiments are possible and these example embodiments of the invention are not intended to limit the scope of the invention as provided by the claims.

Figure 5:
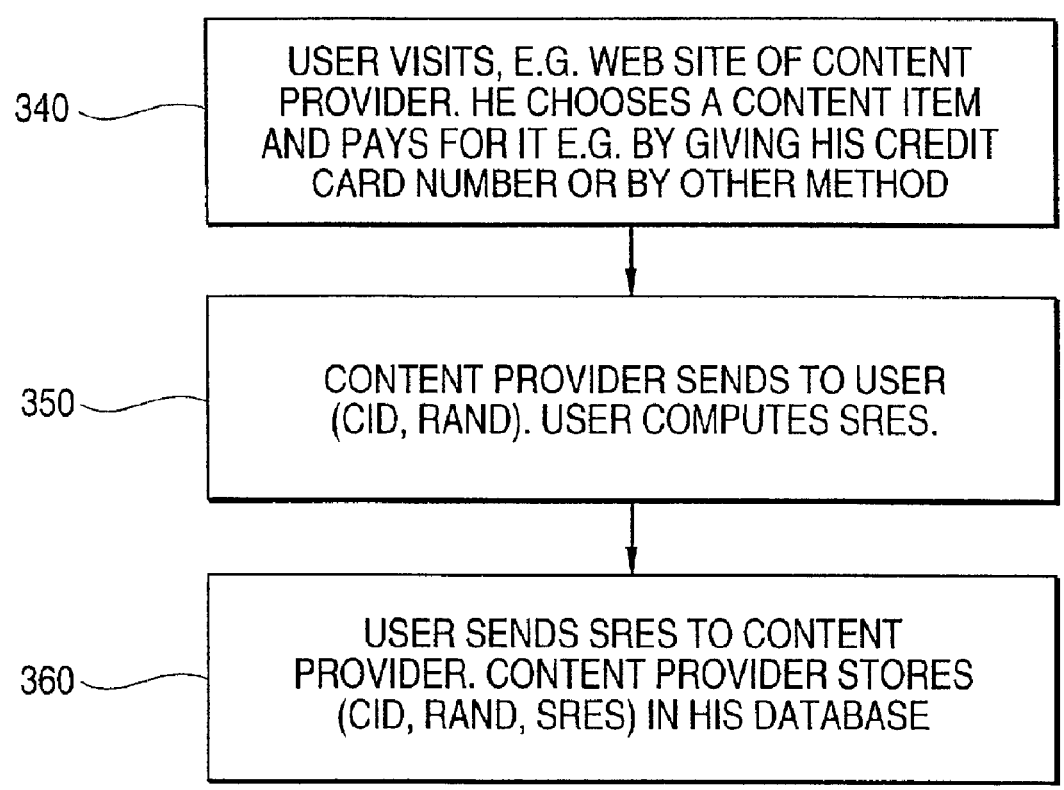
FIG. 5 is a flowchart of a first stage of an example embodiment of the present invention in which a consumer or user orders and pays for a product from a seller or content provider with delivery of the product accomplished through a network operator.
Figure 6:
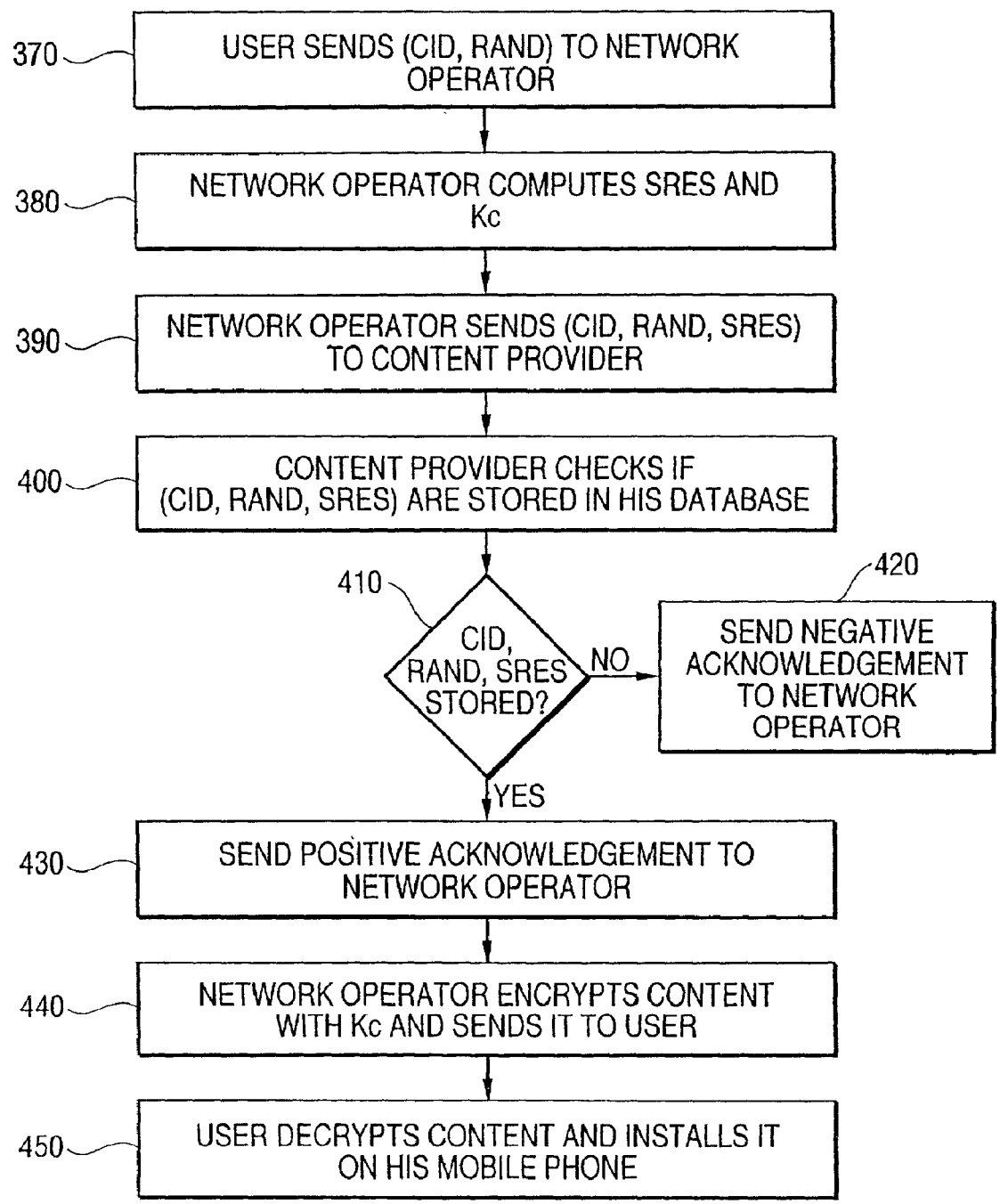
FIG. 6 is a flowchart of a second stage of an example embodiment of the present invention in which a consumer or user orders and pays for a product from a seller or content provider with delivery of the product accomplished through a network operator.

The first example embodiment of the present invention is shown in two stages FIGS. 5 and 6. To summarize, a user or consumer registers with and pays the content provider 30 for a selected content 50, but the content 50 is distributed by network operator 20. The payment that the content provider 30 gives the network operator 20 may be based on, but not limited to, the amount of distributed copies of the content 50.

More specifically, once the user or consumer has been authenticated by the GSM authentication module 1000, as discussed in reference to FIGS. 3, 4 and 15, the user or consumer may execute business model A 1100, shown in FIG. 15, which includes operations 340 through 360, shown in FIG. 5, and operations 370 through 450, shown in FIG. 6. In operation 340, the user or consumer visits, for example, a web site of a content provider 30. While visiting the web site, the user or consumer chooses a content 50 item, such as, but not limited to a new game, and pays for it. This payment 60 may be in the form of providing a credit card number, by money transfer, or by any other way available. This transaction may be encrypted to reduce the risk of a third party intercepting it. In operation 350, after the payment process is completed and approved, the user or consumer receives from a content provider 30 an identifier of the content (CID—content identification), and a random number (RAND) 140, which he uses to compute SRES 150 as was done in the previous discussion in reference FIGS. 2 and 3. In this embodiment, the CID may be used to both identify the content 50 and the content provider 30 that supplies the content 50. This transaction may also be encrypted to reduce the risk of a third party intercepting it. Then in operation 360, the user or consumer then sends a first SRES 150 to content provider 30. Content provider 30 stores the triplet having CID, RAND 140, and SRES 150 in the content provider's 30 database. This stored triplet serves as proof that the user or consumer, has the ability to compute SRES 150 from RAND 140 and has paid for the content 50 as identified by the CID.

As mentioned above, operations 340 and 350 should be encrypted to reduce the possibility of a third party from learning, for example, the user's or consumer's credit card number and the value of RAND 140. This encryption may be done, for example, by encrypting the communication between user and content provider 30 using any of the well known methods, such as a SSL protocol, as discussed in the Internet Draft specification from the Transport Layer Security Working Group entitled "The SSL Protocol Version 3.0" by Freier et al. and dated Nov. 18, 1996, herein incorporated by reference in its entirety.

The second stage of business model A 1100, shown in operations 370 through 450 of FIG. 6 and FIG. 15, is executed when the user wants to download the content 50. In operation 370, the user or consumer sends to the network operator 20 the content identifier (CID) and RAND 140 and then computes a ciphering key Kc 100 using the RAND 140 and his secret key Ki 110, as previously discussed for the GSM authentication module 1000. In an alternative implementation of this example embodiment of this invention, the user or consumer may send both RAND 140 and SRES 150 to the network operator 20.

Once the network operator 20 receives the CID and RAND 140 from the user or consumer, then in operation 380 the network operator 20 computes a second SRES 150 and Kc 100 using A3 Algorithm module 120 and A8 Algorithm module 130 from the RAND 140. In operation 390, the network operator 20 sends the triplet (CID, RAND 140, SRES 150) to content provider 30. Then in operation 400, content provider 30 checks if the triplet (CID, RAND 140, SRES 150) is stored in its database. In operation 410, it is determined if the triplet received from network operator has a matching triplet stored in the content provider 30 database. If a match is not found, then in operation 420 the content provider 30 returns a negative acknowledgment to the network operator 420 and processing terminates. If a match is found, then in operation 430 a positive acknowledgment is sent to network operator 20. After receiving positive acknowledgment in operation 430, network operator 20 encrypts the content 50 with ciphering key Kc 100 and sends it to the user or consumer at the mobile station 10 or PC 40 in operation 440. Then in operation 450, the user or consumer decrypts the content 50 using the key Kc 100 and installs it on his mobile station 10 or PC 40.

The accounting or payment provisions between content provider 30 and network operator 20 may be based on the amount of positive acknowledgments received by the network operator 20. To prevent disputes between content provider 30 and network operator 20, it is possible for the acknowledgments to be digitally signed by the content provider 30. In addition, if we wish to prevent third party from learning the transactions between network operator 20 and content provider 30, then the messages sent in operations 390 and 400 may be encrypted. Encryption of content 50 in operation 440 may be accomplished using an encryption of speech algorithm on the GSM radio path. Also, some other methods of encryption using Kc 100 as the encryption key may be used.

Figure 7:
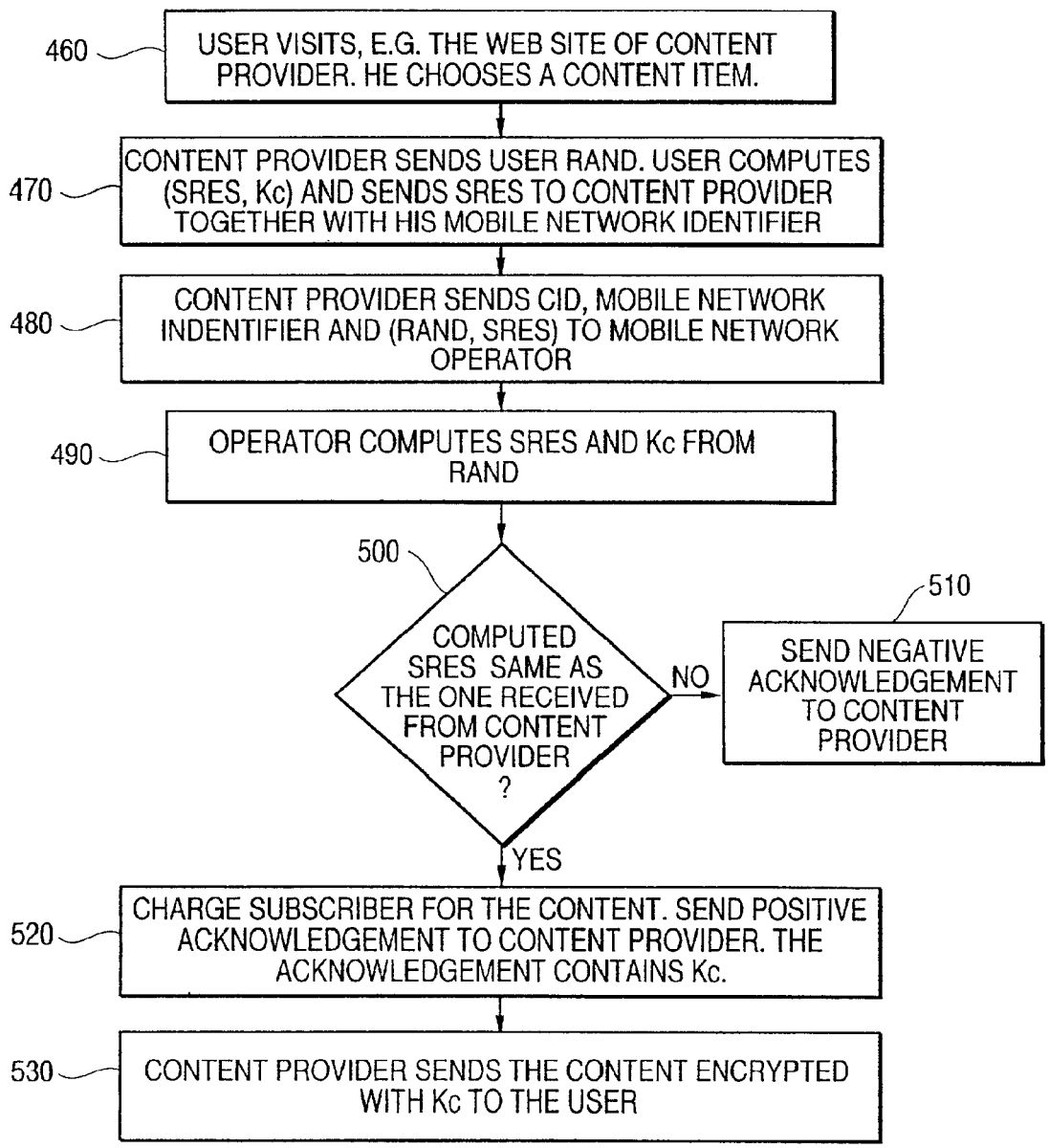
FIG. 7 is a flowchart of an example embodiment of the present invention in which a consumer or user orders and receives a product from a seller or content provider and a network operator collects payment or bills for the product.

FIG. 7 is a flowchart of business model B 1200, shown in FIG. 15, in which a consumer or user orders and receives a content 50 from content provider 30 and a network operator 20 collects payment 60 or bills for the product. Business model B 1200 includes operations 460 through 530 shown in FIG. 7.

To summarize, business model B 1200 enables the user or consumer to register with a content provider 30 and download content 50 from the server of the content provider 30. The network operator 20 then collects the payment 60 from the user or consumer on behalf of the content provider 30. The price of the content 50 may be added to the telephone bill of the consumer or user. The payment 60 that network operator 20 gives to the content provider 30 may be based on, but not limited to, the amount of distributed copies of the content 50.

Referring to FIG. 7, the business model B 1200 begins execution in operation 460 by the user or consumer visiting, for example, a web site of a content provider 30 where he orders a content 50 item, such as a new game. In operation 470, the content provider 30 sends the user a random number (RAND) 140. The user computes a first SRES 150 using A3 algorithm module 120 and Kc 100 using A8 algorithm 130 and sends SRES 150 back to the content provider 30, together with his mobile network identifier. This mobile network identifier may include a location area identity (LAI) and Temporary Mobile Subscriber Identity (TMSI). However, the user may also supply the content provider 30 with an alias which the network operator 20 may use to lookup the mobile network identifier. In operation 480, the content provider 30 sends the content identifier, CID, the mobile network identifier and the pair (RAND 140, SRES 150) to the network operator 20. Thereafter in operation 490, the network operator 20 computes a second SRES 150 and Kc 100 from RAND 140 using A3 algorithm module 120 and A8 algorithm module 130. This calculation is based on the secret key Ki 110 that is stored in the authentication center AuC that is part of the telecom infrastructure 70. In operation 500, a determination is made if the computed value of SRES 150 is the same as the value received from the content provider 30. If the two do not match then processing proceeds to operation 510 where a negative response is sent to the content provider 30. If the two SRES 150 values do match, then processing proceeds to operation 520. In operation 520, the network operator 20 charges the user or consumer for the content 50 and transmits a positive acknowledgment containing the key Kc 100, which enables content provider 30 to encrypt the content 50. Thereafter, in operation 530, the content provider 30 sends the content 50 to the user or consumer encrypted based on Kc 100. The content provider 30 then stores the triplet (CID, RAND 140, SRES 150) in his database. This stored triplet serves as proof that a user or consumer having the capability of computing SRES 150 from RAND 140 has been charged by the network operator 20 for the content 50 identified by the CID.

The business agreement between content provider 30 and network operator 20 may be based on the number of positive acknowledgments given to content provider 30 in operation 520. Further, for security it is preferred that operations 480 and 490 be authenticated by, for example, a digital signature and be encrypted to reduce the possibility of interception by a third party.

Figure 8:
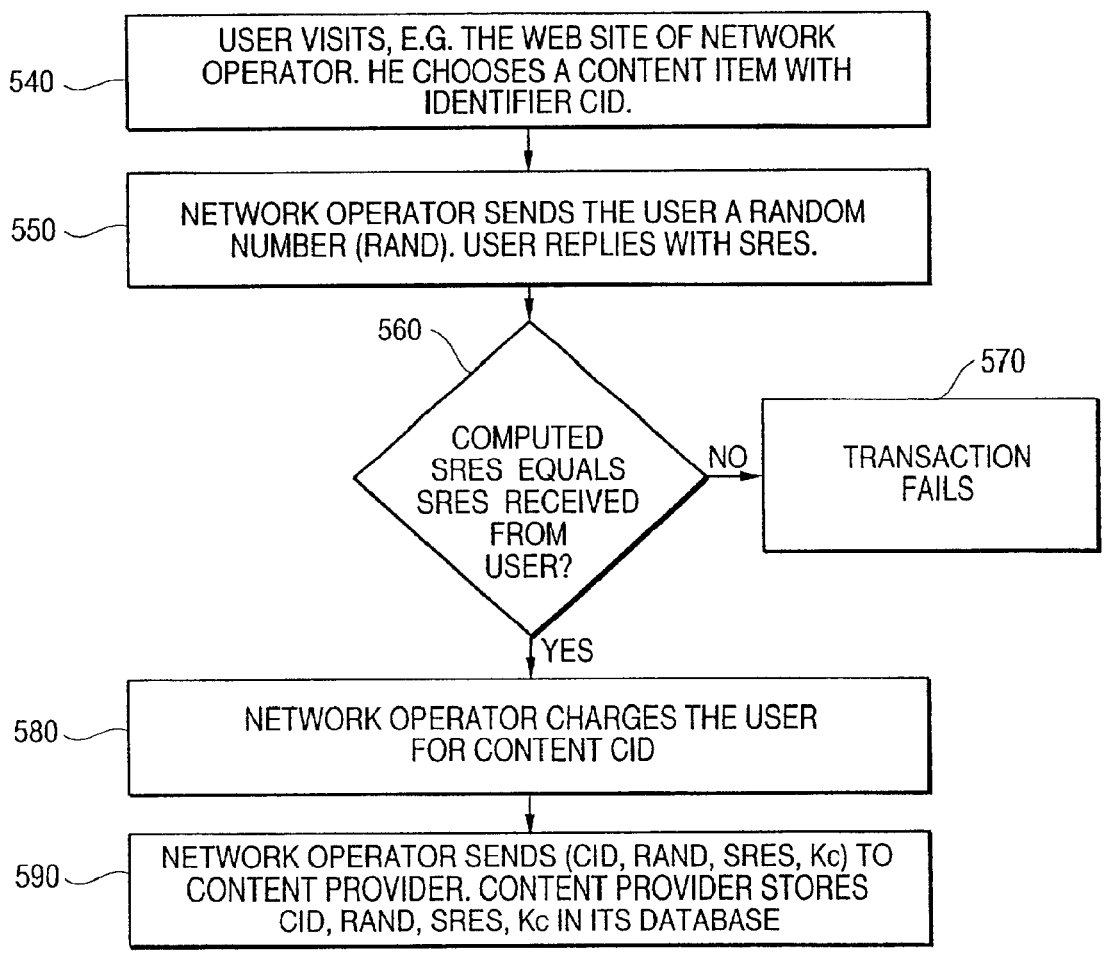
FIG. 8 is a flowchart of a first stage in an example embodiment of the present invention in which a consumer or user orders and pays or is billed for a product from a network operator and then the consumer or user receives the product from the content provider.
Figure 9:
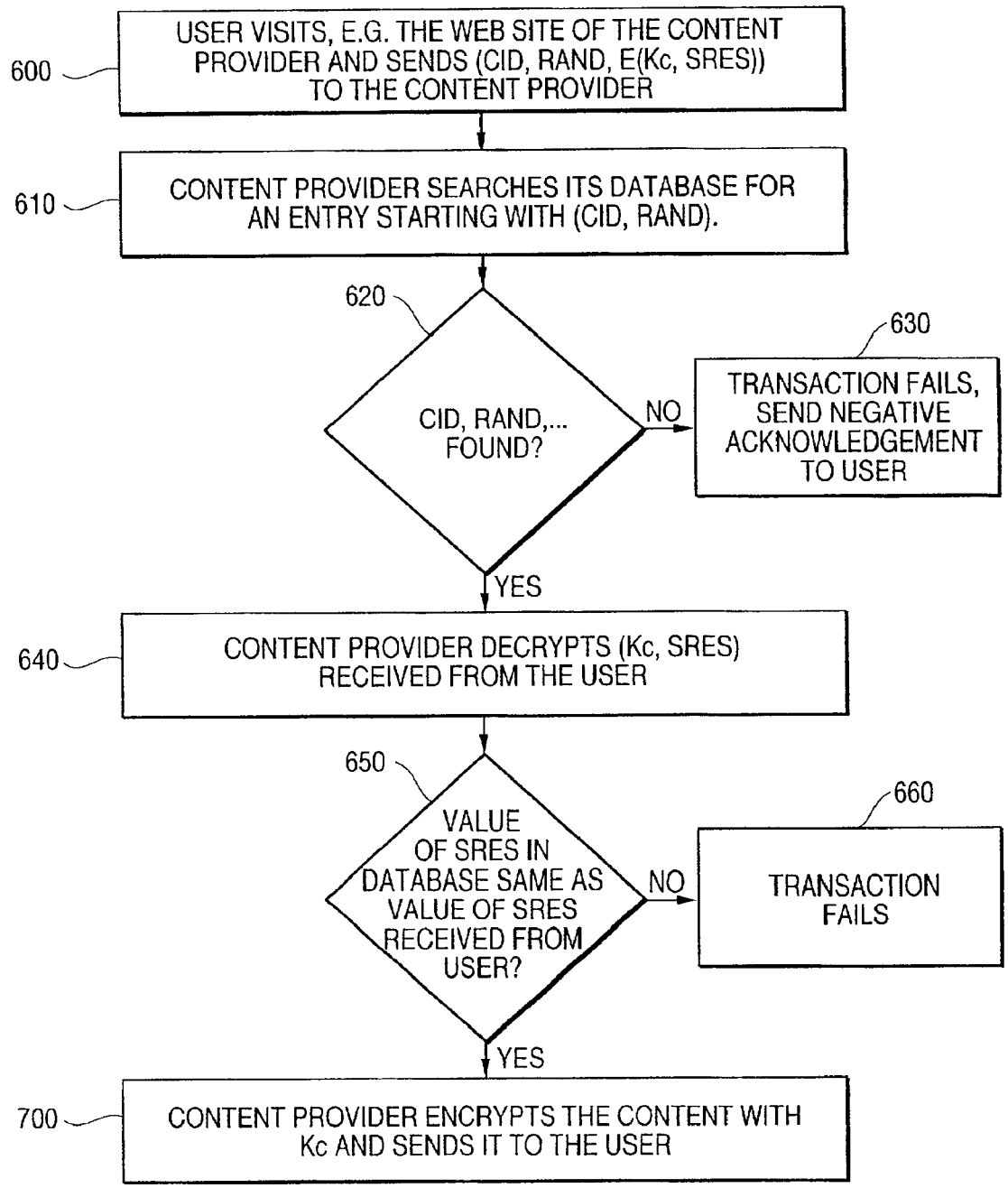
FIG. 9 is a flowchart of a second stage in an example embodiment of the present invention in which a consumer or user orders and pays or is billed for a product from a network operator and then the consumer or user receives the product from the content provider.

FIGS. 8 and 9 are flowcharts illustrating a two stage process in which a consumer or user orders and pays, or is billed, for a content 50 by a network operator 20 and then the consumer or user receives the content 50 from the content provider 30. Operations 540 through 700 illustrated in FIGS. 8 and 9 are performed by a business model C module 1300 shown in FIG. 15. This business model C module 1300, as with all the modules shown in FIG. 15, contain operations that correspond, for example, to code, sections of code, instructions, firmware, hardware, commands or the like, of a computer program.

Referring to FIG. 8, in operation 540, the user or consumer visits a web site of a network operator 20. The user or consumer selects a content 50, such as a new game, with an identifier CID associated with it. Then in operation 550 the network operator 20 sends the consumer or user a random number RAND 140 to which the user replies with a first SRES 150 calculated using the A3 algorithm module 120. In operation 560, it is determined whether the value of SRES 150 received from the user or consumer matches the value of a second SRES 150 computed by the network operator 20. If the two values do not match then processing proceeds to operation 570 where the transaction fails and processing terminates. If the two values match, then processing proceeds operation 580 where the network operator 20 charges the user or consumer the payment 60 for the content 50 by, for example, adding the price of the content 50 to the phone bill. Then in operation 590, the network operator 20 sends the content identifier, CID, and the triplet (RAND 140, SRES 150, Kc 100) to the content provider 30. Upon receipt of the CID and triplet, the content provider 30 stores (CID, RAND 140, SRES 150, Kc 100) in its database. In order to reduce the risk of third party interception, the foregoing message should be authenticated by, for example, a digital signature and also encrypted to ensure secrecy of the values of RAND 140, SRES 150, and Kc 100.

The second stage of the business model C module 1300, shown in FIG. 9, begins when the user or consumer wants to download the content 50. This may occur at any time after the first stage of the business model C module 1300 has completed as shown and discussed in reference to FIG. 8.

Referring to FIG. 9, in operation 600 the user visits, for example, the web site of the content provider 30 and sends to the content provider 30 the CID received in operation 540 of FIG. 8, RAND 140 received in operation 550 of FIG. 8, as well as encrypted copies of Kc 100 and SRES 150 calculated in operation 550 of FIG. 8. SRES 150 is encrypted to prevent a third party who has intercepted the RAND 140 and SRES 150 in operation 550 of FIG. 8 from impersonating the user or consumer. In operation 610, the content provider 30 searches its database for CID, RAND 140, SRES 150, and Kc 100. If it is determined, in operation 620, that matching values are not found, then processing proceeds to operation 630 where a negative acknowledgment is given to the user or consumer and processing terminates. However, if operation 620 determines that a matching entry is found, then processing proceeds operation 640 where the content provider 30 decrypts Kc 100 and SRES 150. If, in operation 650, the value of the first SRES 150 received from the user or consumer is determined not to match the value of the second SRES 150 previously given by the network operator 20, then processing proceeds to operation 660 where the transaction fails and processing terminates. However, if a match is found in operation 650, then the content provider 30 encrypts the content 50 using Kc 100 and transmit the content 50 to the user or consumer at either MS 10 or PC 40, wherever the user or consumer is located.

Using the business model C module 1300 the user or consumer remains anonymous to the content provider 30 which the user or consumer may not know and trust. Further, it is also less likely that the user's identity will be sold to a marketing organization and his credit number, or other method of payment, could be intercepted by a third party.

Figure 10:
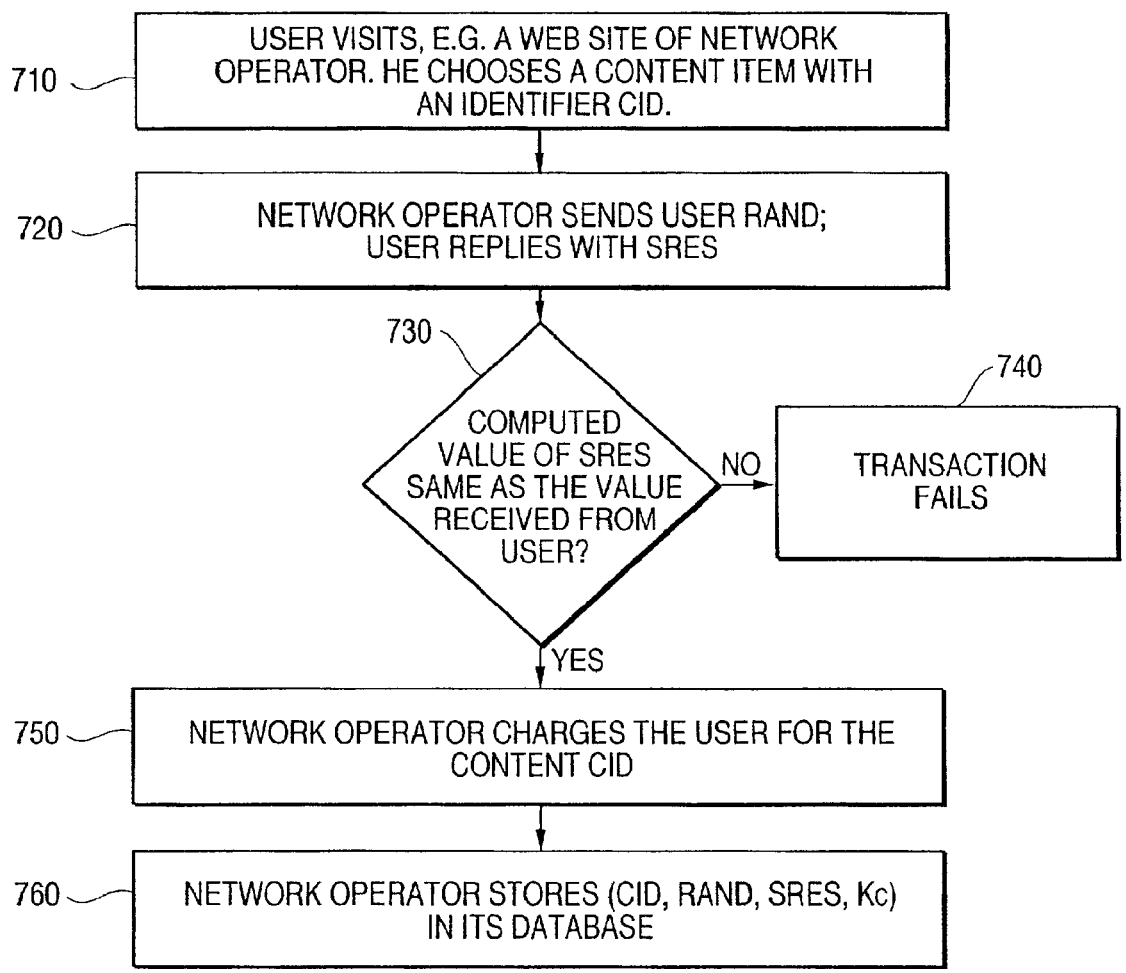
FIG. 10 is a flowchart of a first stage in an example embodiment of the present invention in which a consumer or user orders and pays or is billed for a product from a network operator and receives the product from the network operator.
Figure 11:
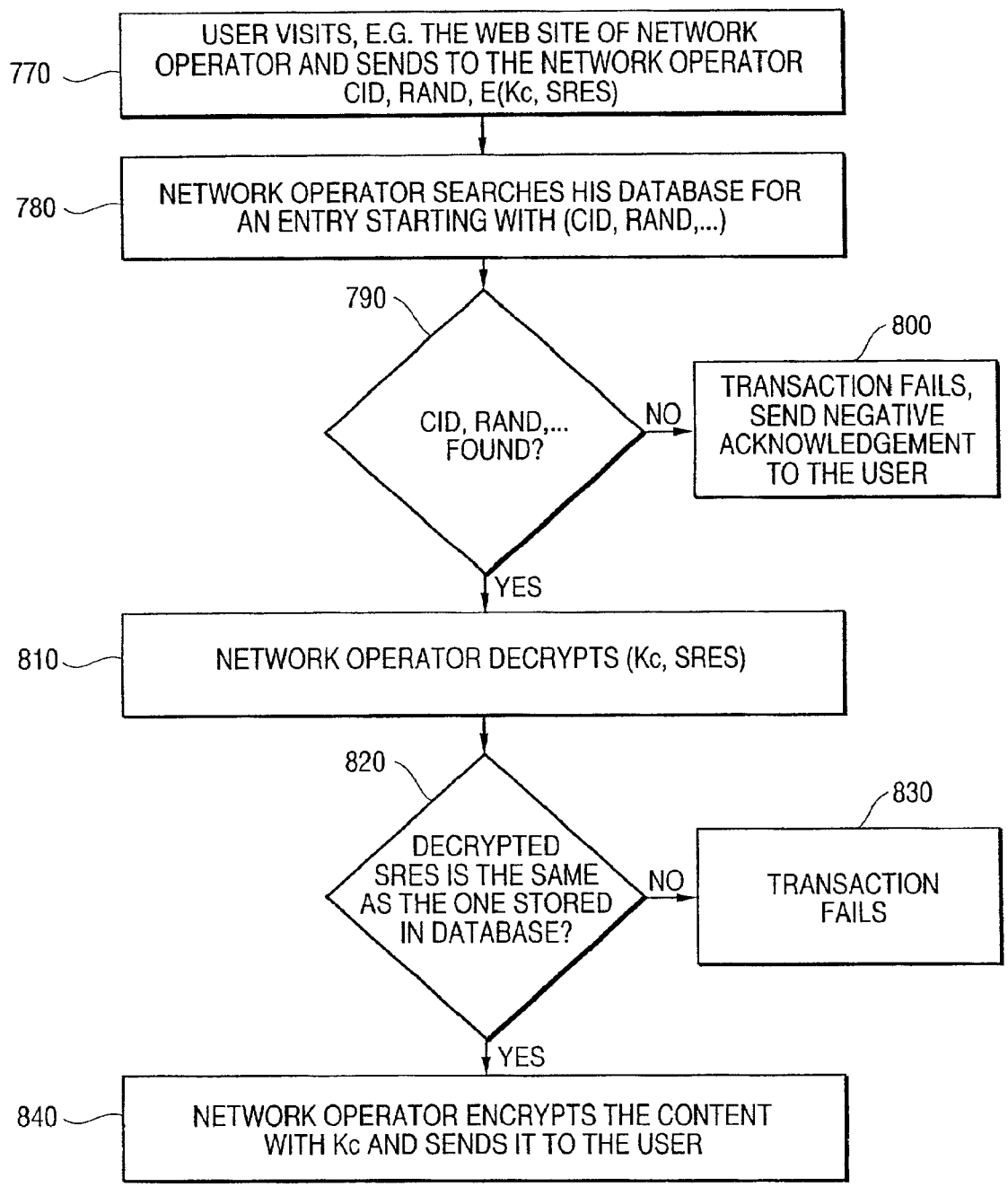
FIG. 11 is a flowchart of a second stage in an example embodiment of the present invention in which a consumer or user orders and pays or is billed for a product from a network operator and receives the product from the network operator.

FIGS. 10 and 11 are flowcharts of a two stage embodiment of the present invention in which a consumer or user orders and pays, or is billed for, a content 50 from a network operator 20 and receives the content 50 from the network operator 20 using the business model D module 1400, shown in FIG. 15. By using business model D module 1400, the user or consumer has no contact with the content provider 30. The network operator 20 both distributes the content 50 and collects the payment 60 for it on behalf of the content provider 30. The price of the content 50 may be simply added to the telephone bill of the user or consumer. The payment 60 that network operator 20 gives content provider 30 may be based on the amount of distributed copies of the content 50 or other suitable agreement. The advantage to the user or consumer is that he is dealing with an entity he is familiar with and trusts. The advantage to the content provider 30 is that he simply supplies the content 50 to the network operator 20 and everything else is taken care of by the network operator 20.

The business model D module 1400 includes operations 710 through 840 shown in FIGS. 10 and 11. Referring to FIG. 10, the business model D module 1400 starts in operation 710 by the user visiting, for example, the web site of the network operator 20 where he selects a content 50, such as a new game having a CID associated with it. In operation 720, the network operator 20 sends the user or consumer a random number (RAND) 140 to which the user replies with a first SRES 150 calculated using A3 algorithm module 120. Then in operation 730, the network operator compares the value of SRES 150 received from the user or consumer to see if it matches the value of a second SRES 150 computed by the network operator 20 also using the A3 algorithm module 120. If the two SRES 150 values do not match then processing proceeds to operation 740 where a transaction failure is reported to the user or consumer. If a match is found in operation 730, then network operator 20 charges the user for the content 50. Thereafter the network operator 20 stores, in operation 760 the triplet having CID, RAND 140, SRES 150, and Kc 100 in its database.

The second stage of the business model D module 1400 occurs when the user 50 wants to download the content 50. This may be substantially after the first stage of the business model D module 1400, shown in FIG. 10, completes and begins by the user or consumer visiting the web site of the network operator 20 and sending the network operator 20 the CID, RAND 140, and encrypted Kc 100 and SRES 150, in operation 770, shown in FIG. 11. The encryption of SRES 150 reduces the risk of a third party intercepting the SRES 150 and impersonating the user or consumer. Thereafter, in operation 780 the network operator 20 searches its database for the CID, RAND 140, SRES 150, and Kc 100. If a matching entry is not found then a negative acknowledgment is sent to the user in operation 800 and processing terminates. If a matching entry is found in operation 790, then in operation 810 the network operator 20 decrypts Kc 100 and SRES 150. If the decrypted SRES 150 value does not match the stored SRES 150 value, then processing proceeds to operation 830 where a transaction failure is reported to the user or consumer and processing terminates. However, if the value of SRES 150 received from the user matches the previously stored value of SRES 150, then processing proceeds to operation 840 where the network operator 20 encrypts the content 50 with Kc 100 and sends it to the user or consumer located at MS 10 or PC 40.

Figure 12:
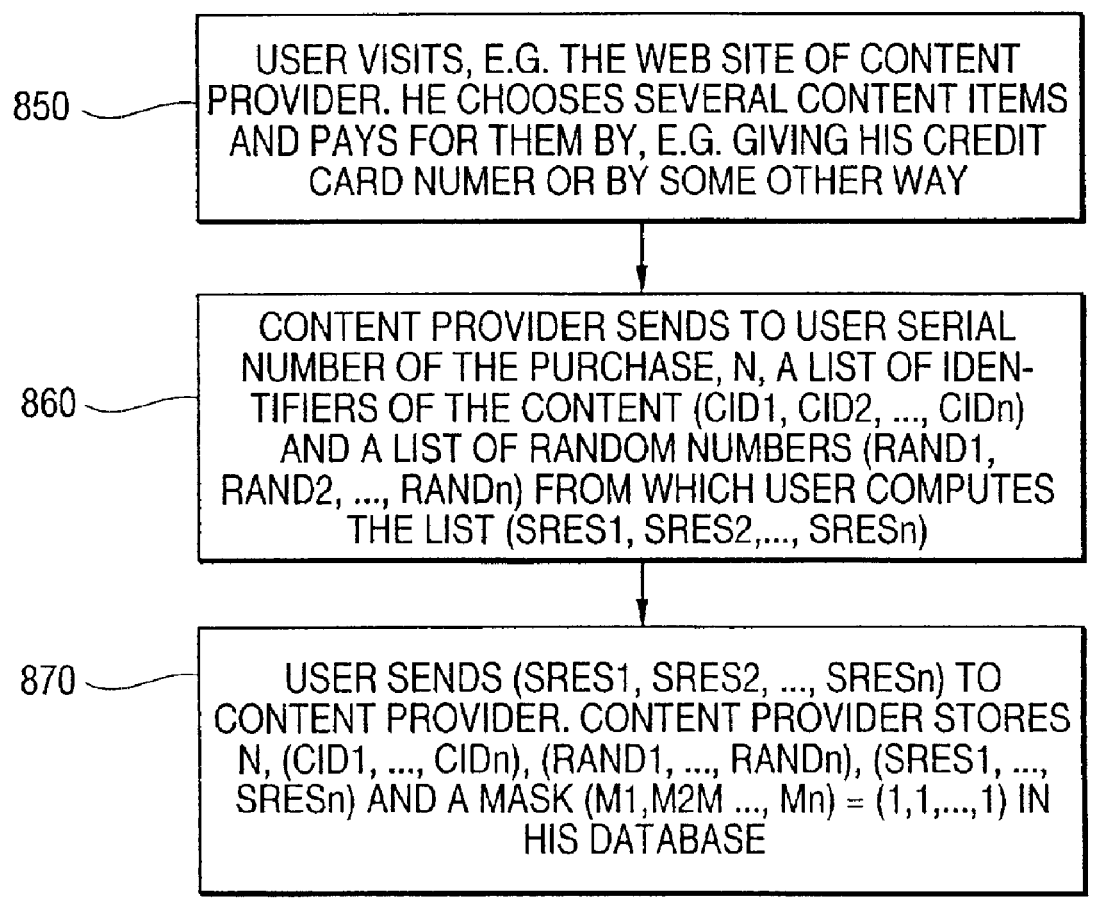
FIG. 12 is a flowchart of a first stage in an example embodiment of the present invention shown in FIGS. 5 and 6 in which a consumer or user orders several different products.
Figure 13:
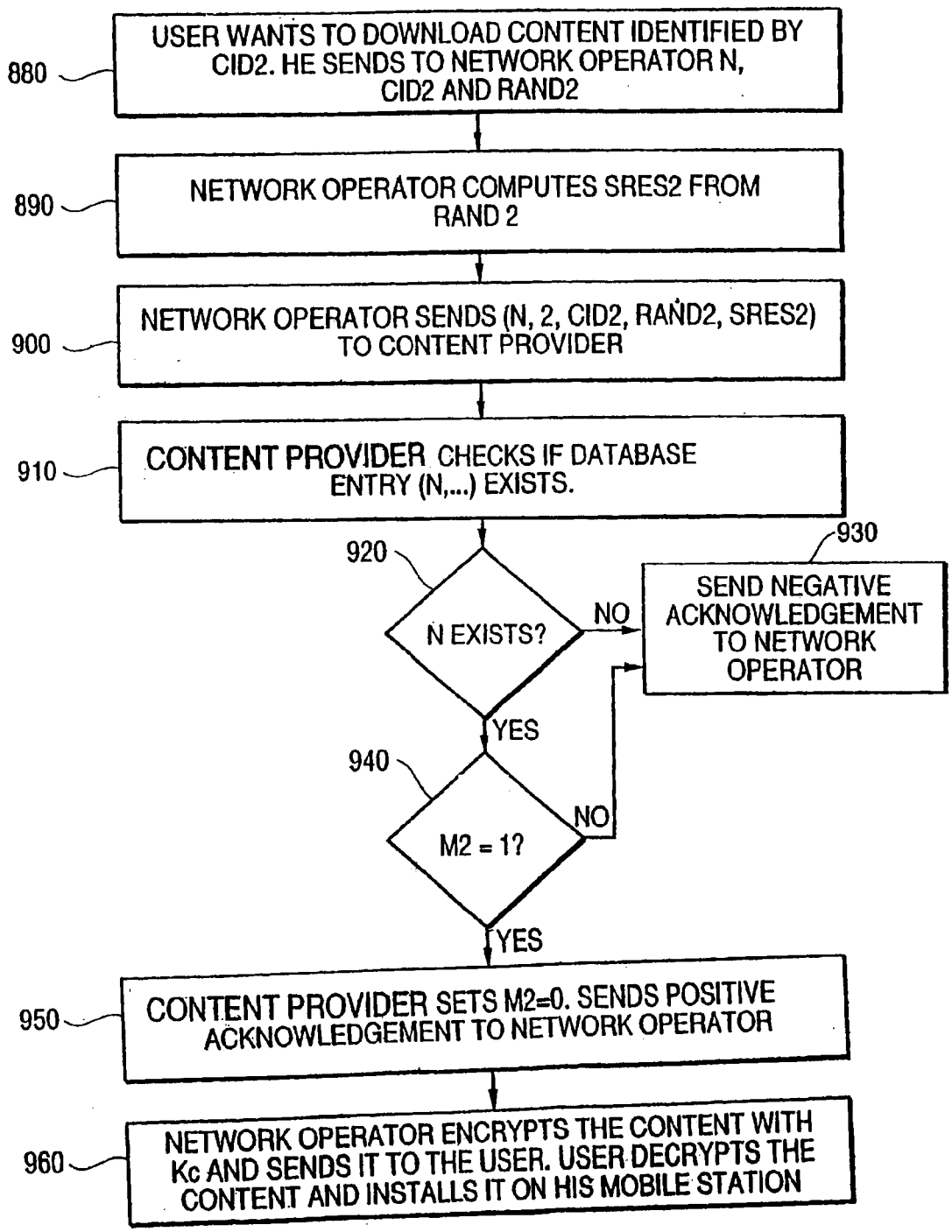
FIG. 13 is a flowchart of a second stage in an example embodiment of the present invention, shown in FIGS. 5 and 6, in which a consumer or user orders several different products.

A further embodiment is possible for the present invention as provided in business model E module 1500, shown in FIG. 15, which includes operations 850 through 960 shown in FIGS. 12 and 13. Business model E module 1500 is similar to business model A module 1100 with the exception that business model E module 1500 enables the user or consumer to purchase several content 50 items at once. As with business model A module 1100, business model E module 1500 enables the user or consumer to register with and pay the content provider 30, but the content 50 is distributed by network operator 20. The fee given by content provider 30 to network operator 20 may be based on the amount of distributed copies of the content 50. The business model E module 1500 operates in two stages. In the first stage, shown in FIG. 12, the transactions between user or consumer and content provider 30 take place.

Referring to FIG. 12, in operation 850 the user or consumer visits, for example, the web site of content provider 30 where he selects several content 50 items and pays for them by, for example, giving his credit card number, by money transfer, or by any other method available. This transaction should be encrypted to prevent a third party from intercepting the transaction. In operation 860, the user or consumer receives from the content provider 30 a serial number of the purchase, N, a list of identifiers of the content (CID1, CID2, . . . CIDn) and a list of random numbers 140 (RAND1, RAND2, . . . , RANDn). The user or consumer then calculates a first series of SRES 150 values (SRES1, SRES2, . . . SRESn) based on the series of RAND 140 values (RAND1, RAND2, . . . , RANDn) supplied using A3 algorithm module 120 previously discussed. Thereafter, in operation 870, the user or consumer sends the first series of SRES 150 values (SRES1, SRES2, . . . SRESn) to content provider 30. The content provider 30 stores the three series of items (CID1, CID2, . . . CIDn), (SRES1, SRES2, . . . SRESn) and (RAND1, RAND2, . . . RANDn) in his database. This database entry is indexed by the serial number of the purchase N. Each entry has also a series of Boolean variables (M1, M2, . . . Mn) associated with it, which are all initially set to 1. The stored data acts as proof that user or consumer has the capability to compute a series of SRES 150 values from a series of RAND 140 values and has paid for the series of contents 50 identified by the series of CID values.

Operations 850 and 860 should be encrypted to reduce the risk of a third party intercepting the information and learning the user's credit card number and the value of RAND 140. This can be done, for example, by encrypting the communication between the user and content provider 30 using one of the known methods, such as an SSL protocol.

Referring to FIG. 13, the second stage of processing for business model E module 1500 occurs when the user wants to download one of the content 50 items which was paid for in the first stage. For example, let the identifier of the content 50 desired be CID2. In operation 880, the user or consumer sends to network operator 20 the serial number of the purchase N, the number of the identifier on the list, which is 2, the content identifier CID2 and RAND2. The user of consumer MS 10 then computes a ciphering key Kc 100 using RAND2 140 and his secret key Ki 110 using A8 algorithm module 130. In an alternative embodiment of business model E module 1500 the user consumer sends both RAND2 140 and SRES2 150. Then in operation 890, the network operator 20 computes a second SRES2 150 value using A3 algorithm module 130 and Kc 100 using A8 algorithm module 130 from RAND2 as previously discussed. In operation 900, the network operator 20 transmits N, 2, CID2, RAND2 140, and SRES2 150 to the content provider 30. Upon receipt, the content provider 30 checks if CID2, RAND2 140, and SRES2 150 are stored in the second item of the list in its database for entry N, in operation 920. If entry N does not exist then processing proceeds to operation 930 in which content provider 30 sends a negative acknowledgment to the network operator 20 and processing terminates. However, if entry N does exist then processing proceeds to operation 940 at which time it is determined if M2=1. If M2 . . . 1 then this indicates that the second item has been consumed by the user, and processing again proceeds to operation 930 as previously discussed and processing halts. However, if M2=1 then processing proceeds to operation 950 and the content provider 30 sends a positive acknowledgment to network operator 20. After receiving positive acknowledgment the network operator 20 encrypts the content 50 with ciphering key Kc 100 and sends it to the user, in operation 910. The user then decrypts the content 50 using the key Kc 100 and installs it on his mobile station 10 or PC 40.

As would be appreciated by one of ordinary skill in the art, business model B module 1200, business model C module 1300 and business model D module 1400 may be modified in a similar fashion as was done to business model A module 1100 to create business model E module 1500 so that a consumer may order several content 50 items.

It is possible to modify business model B module 1200 further so as to bind or force the content provider 30 to a certain price for the product. By using this binding mechanism on the content provider 30, the user or consumer can be assured that he will not be charged a different price for a content 50 item ordered. There exist two mechanisms to bind a content provider 30 to a certain price. The first method uses a one-way hash function and the second method uses Kc 100.

The fundamental reason for binding a content provider 30 to a price for a content 50 is that the user or consumer may have concerns in dealing with an unknown content provider 30. This concern may be unnecessary when the content provider 30 is a large organization with a strong reputation to protect. But there is no fundamental reason preventing anyone from becoming a content provider 30 and exploiting these mechanisms. Consequently, a user or consumer may not necessarily fully trust a content provider 30. If content provider 30 is not fully trusted by the user, the foregoing embodiments of the present invention should be strengthened. This is because when a user initiates a transaction with a malicious content provider 30, it could use the information learned during this transaction (i.e., the pair (RAND 140, SRES 150)) to make a purchase from a different content provider 30 while pretending to be the user. The cost of the purchase from the other content provider 30 could then be added to the user's bill. Or more simply, the user could be charged a higher price for content 50 or even pay for a content 50 that he was not ordered.

Figure 14:
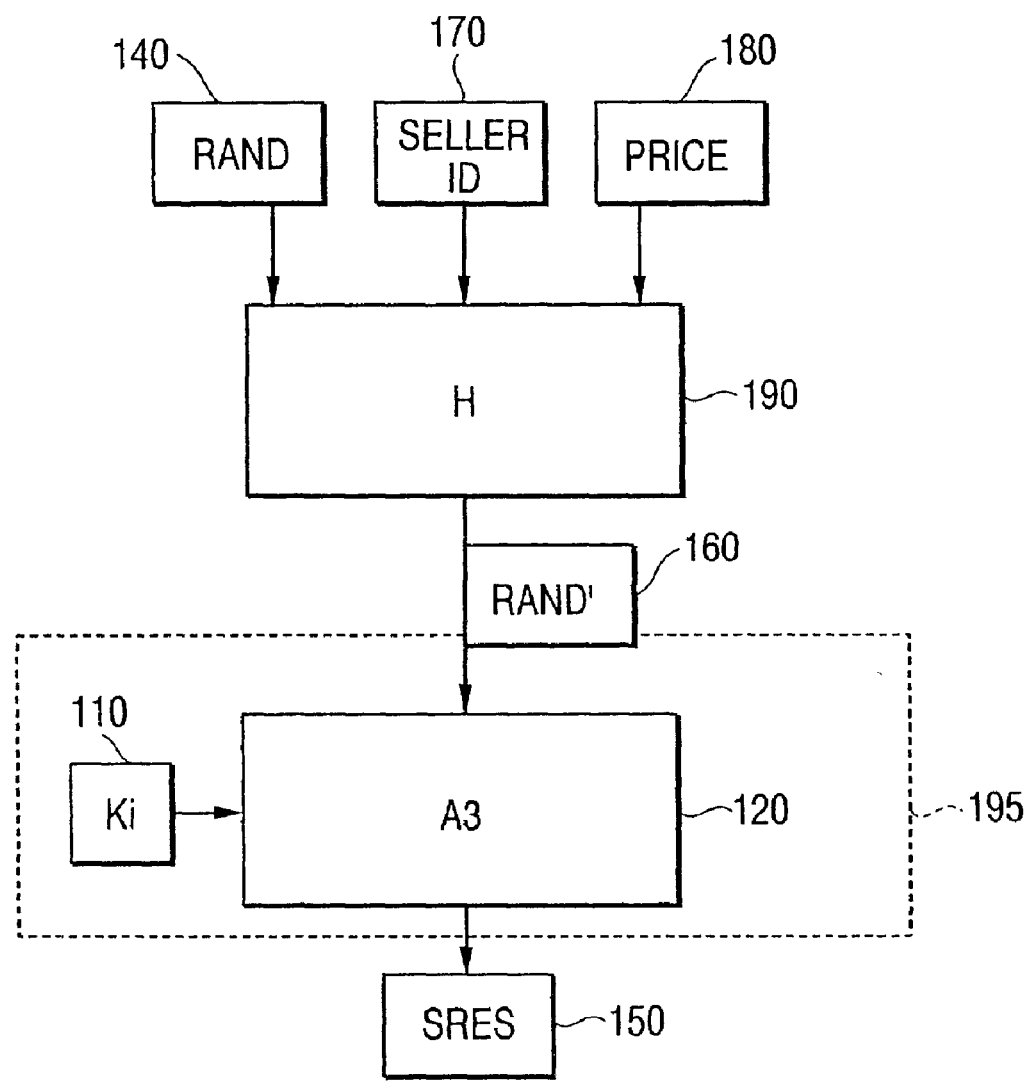
FIG. 14 is a systems diagram of an example embodiment of the present invention in which a hashing algorithm is used to lock or bind a seller or content provider to a certain price for a product.

Referring to FIG. 14, a one-way hash function H 190 is a function which takes an arbitrary length input and produces a fixed length output. Further, the function is easy to compute, but the inverse of the function is nearly impossible to determine. MD5 and SHA-1 are examples of popular one-way hash functions described on pages 347–349 of Chapter "Hash Functions and Data Integrity," of Handbook of Applied Cryptography by A. J. Menezes et al., published by CRC Press, Inc. in 1997, ISBN 0-8493-8523-1, incorporated herein by reference. Both the user and the network operator 20 compute SRES 150 using H 190, as shown in FIG. 14, and any suitable hash function for H 190 which takes three inputs (RAND 140, Seller ID 170, price 180) or the inputs can be concatenated into a single string before being fed to a one-way hash function H 190. Using this one-way hash function (H) 190, the identity of the content provider 30, represented by the seller ID 170, the price 180 of the content 50 and the random number (RAND) 140 are bound together (hashed) into a single fixed variable called the hashed random number (RAND') 160. The response SRES 150 is computed using the A3 algorithm 120 with Ki 110 and RAND' 160 as inputs. Processing then proceeds similarly to business model B 1200 module as discussed above in reference to FIG. 7, with the user sending SRES 150 to the content provider 30. Content provider 30 sends CID, RAND 140, Seller ID 170 and the price 180 to network operator 20. Network operator 20 computes SRES 150 as shown in FIG. 14. It should be noted that if a content provider 30 changes one of the quantities (for example the price 180) that are bound together with H 190 before he sends them to network operator 20, then the value of the second SRES 150 computed by the network operator 20 will not match the value of the first SRES 150 that was computed by the user and forwarded to the network operator 50 by the content provider 30. As a result of the mismatch in computed SRES 150 values the transaction will be rejected by the network operator as possibly fraudulent. In this way the binding mechanism, shown in FIG. 14, protects the user from fraud by dishonest content providers 30.

Another embodiment which would modify business model B module 1200 and bind the content provider 30 to a certain price for the content 50 employs Kc 100. In business model B module 1200, the network operator 20 gives Kc 100 to the content provider 30. This is necessary when the content provider 30 needs to confidentially transfer information back to the user. However, in some scenarios it may not be necessary to reveal Kc 100 to the content provider 30. In this case, the binding could be achieved by encrypting with Kc 100. The user transmits his mobile network identifier, SRES 150, Seller ID, and price 180 he has agreed to pay to the content provider 30 encrypted with Kc 100. The content provider 30 forwards this to the network operator 20 along with his own version of Seller ID 170 and price 180 unencrypted. The network operator 20 can decrypt the encryption to recover SRES 150, Seller ID 170 and price 180 and check if the latter two items match what the content provider 30 sent unencrypted. The remainder of the processing remains unchanged from that shown in business model B module 1200 discussed in reference to FIG. 7.

A further embodiment may be realized in business model A module 1100 and business model D module 1400 through the use of a stronger password from Kc 100 by means of additional cryptographic protocol. Such protocol is described in U.S. Pat. Nos. 5,241,599 and 5,440,635 to Bellovin, et al., incorporated herein by reference. Using this cryptographic protocol in which Kc 100 is the seed, it is possible to transform a weak shared password (Kc 100), into a strong shared password (Kc 100).

Using the foregoing embodiments of the present invention, the sale and access to content 50 is simple and secure using the GSM authentication system and method discussed in reference to FIGS. 2 through 4 and 15 above in conjunction with the business model A module 1100, business model B module 1200, business model C module 1300, business model D module 1400 and business model E module 1500. A user or consumer is secure in the knowledge that he will not be overcharged for a content 50 and that he will receive delivery of content 50. The implementation of the present invention is simplified since there is no need to change the GSM authentication center AuC in the telecom infrastructure 70.

While we have shown and described only a few examples herein, it is understood that numerous changes and modifications as known to those skilled in the art could be made to the present invention. For example, instead of down loading content after the payment, the user may be granted access to a shared network resource. In this way, the user may be granted access rights to a networked game server. If the access rights are temporary, then the expiration time of those rights may be stored together with CID, RAND 140 and SRES 150. Instead of paying for content 50 the user may just registers with the content provider 30. The encryption of content 50 may be accomplished in the same way as the encryption of speech on the GSM radio path. It is also possible to implement payment 60 and access control based on same kind of mechanism (smart cards (SIM), random number (RAND) 140, and service response (SRES) 150) when the user has a smart cards, similar to the SIM, but is not a subscriber of a network operator 20. Further, the users portion of the authentication mechanism can be implemented on a PC, without a smart card. Therefore, we do not wish to be limited to the details shown and described herein, but intend to cover all such changes and modifications as are encompassed by the scope of the appended claims.

We claim:

1. A method of ordering, paying for and delivering content, comprising:

ordering and paying for the content by a user at a first location, the content being selected from a content provider;

transmitting a first service response value calculated by the user to the content provider;

calculating a second service response value by a network operator when the user at a second location, different from the first location, requests the content from the network operator;

verifying, by the network operator contacting the content provider, that the first service response value matches the second service response value; and transmitting the content to the user at the second location by the network operator when the first service response value matches the second service response value, wherein:

at least one of ordering and paying for the content, transmitting the first service response value, and transmitting the content is done by a network.

2. The method recited in claim 1, wherein the first service response value is calculated by the user based on a random number supplied by the content provider and a first secret key possessed by the user.

3. The method recited in claim 1, wherein the second service response value is calculated by the network operator based on a random number received from the user and a second secret key possessed by the network operator and associated with the user.

4. The method recited in claim 2, wherein the first secret key is contained in a subscriber identification module provided by the network operator and contained in a mobile station within the network which is a wireless network operated by the network operator in such a manner that the mobile user and the mobile station may not discover the value of the secret key.

5. The method recited in claim 3, wherein the second secret key is stored in an authentication center of a telecom infrastructure operated by the network operator and the first secret key and the second secret key are identical and assigned when the user subscribes for a telecommunication service provided by the network operator.

6. The method recited in claim 4, wherein the first service response value is calculated by an A3 algorithm module contained in the subscriber identification module of the mobile station based on the first secret key and the random number.

7. The method recited in claim 5, wherein the second service response value is calculated by an A3 algorithm module, contained in the authentication center of the telecom infrastructure, based on the second secret key, contained in the authentication center of the telecom infrastructure, and the random number.

8. The method recited in claim 6, wherein the mobile station is a cellular phone with GSM authentication capability connected to a processor based system, or a WAP-capable cellular phone with GSM authentication capability, or a HTML capable cellular phone with GSM authentication capability.

9. The method recited in claim 7, wherein the content is encrypted by the network operator using a cipher key, calculated by an A8 algorithm module based on the random number and the second secret key, prior to transmitting the content to the user.

10. The method recited in claim 8, further comprising:
decrypting the content by the mobile station using an A8 algorithm module contained in the subscriber identification module of the mobile station to generate the cipher key based on the random number and the first secret key.

11. The method recited in claim 9, wherein the cipher key is used as a seed to a cryptographic protocol which transforms the cipher key into a stronger cipher key.

12. The method recited in claim 1, wherein the user pays the content provider for the content, using a credit card, debit card, or electronic transferral of funds.

13. A method of ordering, paying for and delivering content, comprising:
ordering the content having a content ID by a user at a first location, the content being selected from a content provider;
transmitting a first service response value, a network identifier, and a cipher key by the user to the content provider;
transmitting the first service response value, the network identifier, and a random number to a network operator by the content provider;
calculating a second service response value and a cipher key by the network operator and determining if the first service response value matches the second service response value; and
transmitting the content to the user at a second location, different from the first location, when the first service response value matches the second service response value, by the content provider, wherein:
at least one of ordering the content, transmitting the first service response value, and transmitting the content is done by a network.

14. The method recited in claim 13, wherein the first service response value is calculated by the user based on a random number supplied by the content provider and a first secret key contained in a subscriber identification module provided by the network operator and contained in a mobile station within the network which is a wireless network operated by the network operator.

15. The method recited in claim 13, wherein the second service response value and a cipher key are calculated based on the random number, and a network identifier, used to access a second secret key located in an authentication center of a telecom infrastructure, received from the content provider.

16. The method recited in claim 14, wherein the first secret key is not accessible directly by the user or the mobile station and the value of the secret key may not be discovered by the user, but is identical to the second secret key and both the first secret key and the second secret key are assigned when the user subscribes for a telecommunication service provided by the network operator.

17. The method recited in claim 16, wherein the first service response value is calculated by an A3 algorithm module contained in the subscriber identification module of the mobile station based on the first secret key and the random number.

18. The method recited in claim 15, wherein the second service response value is calculated by an A3 algorithm module, contained in the authentication center of the telecom infrastructure, based on the second secret key, contained in the authentication center of the telecom infrastructure, and the random number.

19. The method recited in claim 17, wherein the mobile station is a cellular phone with GSM authentication capability connected to a processor based system, or a WAP-capable cellular phone with GSM authentication capability, or a HTML capable cellular phone with GSM authentication capability.

20. The method recited in claim 18, wherein the content is encrypted by the network operator using the cipher key, calculated by an A8 algorithm module based on the random number and the second secret key, prior to transmitting the content to the user.

21. The method recited in claim 19, further comprising:
decrypting the content by the mobile station using an A8 algorithm module contained in the subscriber identification module of the mobile station to generate a cipher key based on the random number and the first secret key.

22. The method recited in claim 13, wherein the user is billed by the network operator for the content in a telephone bill.

23. The method recited in claim 13, further comprising:
hashing, by the user, a price of the content, the random number and a seller ID to create a hashed number;
computing, by the user, the first service response value based on the secret key and the hashed random number;
transmitting, by the user, the first service response value to the content provider;
transmitting, by the content provider, the random number, the seller ID the price of the content and the first service response to the network operator;
computing, by the network operator, the second service response value based on the secret key, the price transmitted by the content provider and the random number;
verifying, by the network operator that the first service response value matches the second service response value; and
billing the user, by the network operator, the price when the first service response value matches the second service response value in a telephone bill.

24. The method recited in claim 20, wherein the cipher key is used as a seed to a cryptographic protocol which transforms the cipher key into a stronger cipher key.

25. A method of ordering, paying for and delivering content, comprising:
ordering the content from a network operator, having a content ID selected by a user at a first location;
transmitting a first service response value calculated by the user to the network operator;
calculating a second service response value and a cipher key by the network operator and determining if the first service response value matches the second service response value;
transmitting the content ID, and a cipher key to Ha content provider; and
transmitting the content to the user at a second location, different from the first location, by the content provider when requested by the user, wherein:
at least one of ordering the content, transmitting the first service response value, and transmitting the content is done by a network.

26. The method recited in claim 25, wherein the first service response value is calculated by the user based on a random number supplied by the network operator and a first secret key possessed by the user.

27. The method recited in claim 25, wherein the second service response value is calculated by the network operator based on the random number and a second secret key possessed by the network operator and associated with the user.

28. The method recited in claim 26, wherein the first secret key is contained in a subscriber identification module provided by the network operator and contained in a mobile station within the network which is a wireless network operated by the network operator in such a manner that the user and the mobile station may not discover the value of the secret key.

29. The method recited in claim 27, wherein the second secret key is stored in an authentication center of a telecom infrastructure operated by the network operator and the first secret key and the second secret key are identical and assigned when the user subscribes for a telecommunication service provided by the network operator.

30. The method recited in claim 28, wherein the first service response value is calculated by an A3 algorithm module contained in the subscriber identification module of the mobile station based on the first secret key and the random number.

31. The method recited in claim 29, wherein and the second service response value is calculated by an A3 algorithm module, contained in the authentication center of the telecom infrastructure based on the second secret key, contained in the authentication center of the telecom infrastructure, and the random number.

32. The method recited in claim 30, wherein the station is a cellular phone with GSM authentication capability connected to a processor based system, or a WAP-capable cellular phone with GSM authentication capability, or a HTML capable cellular phone with GSM authentication capability.

33. The method recited in claim 31, wherein the content is encrypted by the content provider using a cipher key, calculated by an A8 algorithm module based on the random number and the second secret key and supplied by the network operator, prior to transmitting the content to the user.

34. The method recited in claim 32, further comprising:
decrypting the content received by from the content provider by the mobile station using an A8 algorithm module contained in the subscriber identification module of the mobile station to generate a cipher key based on the random number and the first secret key.

35. The method recited in claim 33, wherein the cipher key is used as a seed to a cryptographic protocol which transforms the cipher key into a stronger cipher key.

36. The method recited in claim 25, wherein the user is billed by the network operator for the content in a telephone bill.

37. A method of ordering, paying for and delivering content, comprising:
ordering the content, having a content ID, by a user at a first location, the content being selected from a network operator,
transmitting a first service response value calculated by the user to the network operator;
calculating a second service response value and a cipher key by the network operator and determining if the first service response value matches the second service response value; and
transmitting the content to the user at a second location, different from the first location, by the network operator when requested by the user wherein:
at least one of ordering the content, transmitting the first service response value, and transmitting the content is done by a network.

38. The method recited in claim 37, wherein the first service response value is calculated by the user based on a random number supplied by the network operator and a first secret key possessed by the user.

39. The method recited in claim 37, wherein the second service response value is calculated by the network operator based on a random number and a second secret key possessed by the network operator and associated with the user.

40. The method recited in claim 38, wherein the first secret key is contained in a subscriber identification module provided by the network operator and contained in a mobile station within the network which is a wireless network operated by the network operator in such a manner that the user and the mobile station may not discover the value of the secret key.

41. The method recited in claim 39, wherein the second secret key is stored in an authentication center of a telecom infrastructure operated by the network operator and the first secret key and the second secret key are identical and assigned when the user subscribes for a telecommunication service provided by the network operator.

42. The method recited in claim 40, wherein the first service response value is calculated by an A3 algorithm module contained in the subscriber identification module of the mobile station based on the first secret key and the random number.

43. The method recited in claim 41, wherein the second service response value is calculated by an A3 algorithm module, contained in the authentication center of the telecom infrastructure, based on the second secret key, contained in the authentication center of the telecom infrastructure, and the random number.

44. The method recited in claim 42, wherein the mobile station is a cellular phone with GSM authentication capability connected to a processor based system, or a WAP-capable cellular phone with GSM authentication capability, or a HTML capable cellular phone with GSM authentication capability.

45. The method recited in claim 43, wherein the content is encrypted by the network operator using a cipher key, calculated by an A8 algorithm module based on the random number and the second secret key and supplied by the network operator, prior to transmitting the content to the user.

46. The method recited in claim 44, further comprising:
decrypting the content received by from the network operator by the mobile station using an A8 algorithm module contained in the subscriber identification module of the mobile station to generate a cipher key based on the random number and the first secret key.

47. The method recited in claim 45, wherein the cipher key is used as a seed to a cryptographic protocol which transforms the cipher key into a stronger cipher key.

48. The method recited in claim 37, wherein the user is billed by the network operator for the content in a telephone bill.

49. A method of ordering, paying for and delivering contents, comprising:
ordering and paying for the contents by a user at a first location, the content being selected from a content provider;
transmitting a plurality of first service response values calculated by the user to the content provider;
calculating a plurality of second service response values by a network operator when the user at a second location, different from the first location, requests one of the contents from the network operator;

verifying, by the network operator contacting the content provider, that one of the plurality of first service response values associated with the requested contents matches one of the plurality of second service response values associated with the requested contents; and transmitting one of the requested contents to the user at a second location different from the first location, by the network operator when the one of the plurality of first service response values matches the one of the plurality of second service response values, wherein:

at least one of ordering and paying for the plurality of contents, transmitting the plurality of first service response values, and transmitting the requested content is done by a network.

50. The method recited in claim 49, wherein the plurality of first service response values are calculated by the user based on a plurality of random numbers supplied by the content provider and a first secret key possessed by the user.

51. The method recited in claim 49, wherein the plurality of second service response values are calculated by the network operator based on a plurality of random numbers received from the user and a second secret key possessed by the network operator and associated with the user.

52. The method recited in claim 50, wherein the first secret key is contained in a subscriber identification module provided by the network operator and contained in a mobile station within the network which is a wireless network operated by the network operator in such a manner that the user and the station may not discover the value of the secret key.

53. The method recited in claim 51, wherein the second secret key is stored in an authentication center of a telecom infrastructure operated by the network operator and the first secret key and the second secret key are identical and assigned when the user subscribes for a telecommunication service provided by the network operator.

54. The method recited in claim 52, wherein the plurality of first service response values are calculated by an A3 algorithm module contained in the subscriber identification module of the mobile station based on the first secret key and the plurality of random numbers.

55. The method recited in claim 53, wherein and the plurality of second service response values are calculated by an A3 algorithm module, contained in the authentication center of the telecom infrastructure based on the second secret key, contained in the authentication center of the telecom infrastructure, and the plurality of random numbers.

56. The method recited in claim 54, wherein the mobile station is a cellular phone with GSM authentication capability connected to a processor based system, or a WAP-capable cellular phone with GSM authentication capability, or a HTML capable cellular phone with GSM authentication capability.

57. The method recited in claim 55, wherein the requested content is encrypted by the network operator using a cipher key, calculated by an A8 algorithm module based on a random number of the plurality of random numbers and the second secret key, prior to transmitting the requested to the user.

58. The method recited in claim 56, further comprising:
decrypting the requested content by the mobile station using an A8 algorithm module contained in the subscriber identification module of the mobile station to generate a cipher key based on one random number of the plurality of random numbers and the first secret key.

59. The method recited in claim 57, wherein the cipher key is used as a seed to a cryptographic protocol which transforms the cipher key into a stronger cipher key.

60. The method recited in claim 49, wherein the user pays the content provider for the plurality of contents, using a credit card, debit card, or electronic transferral of funds.

61. A method in accordance with claim 1 wherein:
the network is a wireless network operated by the network operator; and
the user uses a mobile station within the wireless network to receive the content at the second location.

62. A method in accordance with claim 2 wherein:
the network is a wireless network operated by the network operator; and
the user uses a mobile station within the wireless network to receive the content at the second location.

63. A method in accordance with claim 3 wherein:
the network is a wireless network operated by the network operator; and
the user uses the mobile station within the wireless network to receive the content at the second location.

64. A method in accordance with claim 4 wherein:
the network is a wireless network operated by the network operator; and
the user uses a mobile station within the wireless network to receive the content at the second location.

65. A method in accordance with claim 5 wherein:
the network is a wireless network operated by the network operator; and
the user uses a mobile station within the wireless network to receive the content at the second location.

66. A method in accordance with claim 6 wherein:
the network is a wireless network operated by the network operator; and
the user uses the mobile station within the wireless network to receive the content at the second location.

67. A method in accordance with claim 7 wherein:
the network is a wireless network operated by the network operator; and
the user uses a mobile station within the wireless network to receive the content at the second location.

68. A method in accordance with claim 8 wherein:
the network is a wireless network operated by the network operator; and
the user uses the mobile station within the wireless network to receive the content at the second location.

69. A method in accordance with claim 9 wherein:
the network is a wireless network operated by the network operator; and
the user uses a mobile station within the wireless network to receive the content at the second location.

70. A method in accordance with claim 10 wherein:
the network is a wireless network operated by the network operator; and
the user uses the mobile station within the wireless network to receive the content at the second location.

71. A method in accordance with claim 11 wherein:
the network is a wireless network operated by the network operator; and
the user uses a mobile station within the wireless network to receive the content at the second location.

72. A method in accordance with claim 12 wherein:
the network is a wireless network operated by the network operator; and
the user uses a mobile station within the wireless network to receive the content at the second location.

73. A method in accordance with claim 13 wherein:
the network is a wireless network operated by the network operator; and
the user uses a mobile station within the wireless network to receive the content at the second location.

74. A method in accordance with claim 14 wherein:
the network is a wireless network operated by the network operator; and
the user uses the mobile station within the wireless network to receive the content at the second location.

75. A method in accordance with claim 15 wherein:
the network is a wireless network operated by the network operator; and
the user uses a mobile station within the wireless network to receive the content at the second location.

76. A method in accordance with claim 16 wherein:
the network is a wireless network operated by the network operator; and
the user uses the mobile station within the wireless network to receive the content at the second location.

77. A method in accordance with claim 17 wherein:
the network is a wireless network operated by the network operator; and
the user uses the mobile station within the wireless network to receive the content at the second location.

78. A method in accordance with claim 18 wherein:
the network is a wireless network operated by the network operator; and
the user uses a mobile station within the wireless network to receive the content at the second location.

79. A method in accordance with claim 19 wherein:
the network is a wireless network operated by the network operator; and
the user uses the mobile station within the wireless network to receive the content at the second location.

80. A method in accordance with claim 20 wherein:
the network is a wireless network operated by the network operator; and
the user uses a mobile station within the wireless network to receive the content at the second location.

81. A method in accordance with claim 21 wherein:
the network is a wireless network operated by the network operator; and
the user uses the mobile station within the wireless network to receive the content at the second location.

82. A method in accordance with claim 22 wherein:
the network is a wireless network operated by the network operator; and
the user uses a mobile station within the wireless network to receive the content at the second location.

83. A method in accordance with claim 23 wherein:
the network is a wireless network operated by the network operator; and
the user uses a mobile station within the wireless network to receive the content at the second location.

84. A method in accordance with claim 24 wherein:
the network is a wireless network operated by the network operator; and
the user uses a mobile station within the wireless network to receive the content at the second location.

85. A method in accordance with claim 25 wherein:
the network is a wireless network operated by the network operator; and
the user uses a mobile station within the wireless network to receive the content at the second location.

86. A method in accordance with claim 26 wherein:
the network is a wireless network operated by the network operator; and
the user uses a mobile station within the wireless network to receive the content at the second location.

87. A method in accordance with claim 27 wherein:
the network is a wireless network operated by the network operator; and
the user uses a mobile station within the wireless network to receive the content at the second location.

88. A method in accordance with claim 28 wherein:
the network is a wireless network operated by the network operator; and
the user uses the mobile station within the wireless network to receive the content at the second location.

89. A method in accordance with claim 29 wherein:
the network is a wireless network operated by the network operator; and
the user uses a mobile station within the wireless network to receive the content at the second location.

90. A method in accordance with claim 30 wherein:
the network is a wireless network operated by the network operator; and
the user uses the mobile station within the wireless network to receive the content at the second location.

91. A method in accordance with claim 31 wherein:
the network is a wireless network operated by the network operator; and
the user uses a mobile station within the wireless network to receive the content at the second location.

92. A method in accordance with claim 32 wherein:
the network is a wireless network operated by the network operator; and
the user uses a mobile station within the wireless network to receive the content at the second location.

93. A method in accordance with claim 33 wherein:
the network is a wireless network operated by the network operator; and
the user uses a mobile station within the wireless network to receive the content at the second location.

94. A method in accordance with claim 34 wherein:
the network is a wireless network operated by the network operator; and
the user uses the mobile station within the wireless network to receive the content at the second location.

95. A method in accordance with claim 35 wherein:
the network is a wireless network operated by the network operator; and
the user uses a mobile station within the wireless network to receive the content at the second location.

96. A method in accordance with claim 36 wherein:
the network is a wireless network operated by the network operator; and
the user uses a mobile station within the wireless network to receive the content at the second location.

97. A method in accordance with claim 37 wherein:
the network is a wireless network operated by the network operator; and
the user uses a mobile station within the wireless network to receive the content at the second location.

98. A method in accordance with claim 38 wherein:
the network is a wireless network operated by the network operator; and
the user uses a mobile station within the wireless network to receive the content at the second location.

99. A method in accordance with claim 39 wherein:
the network is a wireless network operated by the network operator; and
the user uses a mobile station within the wireless network to receive the content at the second location.

100. A method in accordance with claim 40 wherein:
the network is a wireless network operated by the network operator; and
the user uses the mobile station within the wireless network to receive the content at the second location.

101. A method in accordance with claim 41 wherein:
the network is a wireless network operated by the network operator; and
the user uses a mobile station within the wireless network to receive the content at the second location.

102. A method in accordance with claim 42 wherein:
the network is a wireless network operated by the network operator; and
the user uses the mobile station within the wireless network to receive the content at the second location.

103. A method in accordance with claim 43 wherein:
the network is a wireless network operated by the network operator; and
the user uses a mobile station within the wireless network to receive the content at the second location.

104. A method in accordance with claim 44 wherein:
the network is a wireless network operated by the network operator; and
the user uses the mobile station within the wireless network to receive the content at the second location.

105. A method in accordance with claim 45 wherein:
the network is a wireless network operated by the network operator; and
the user uses a mobile station within the wireless network to receive the content at the second location.

106. A method in accordance with claim 46 wherein:
the network is a wireless network operated by the network operator; and
the user uses the mobile station within the wireless network to receive the content at the second location.

107. A method in accordance with claim 47 wherein:
the network is a wireless network operated by the network operator; and
the user uses a mobile station within the wireless network to receive the content at the second location.

108. A method in accordance with claim 48 wherein:
the network is a wireless network operated by the network operator; and
the user uses a mobile station within the wireless network to receive the content at the second location.

109. A method in accordance with claim 49 wherein:
the network is a wireless network operated by the network operator; and
the user uses a mobile station within the wireless network to receive the content at the second location.

110. A method in accordance with claim 50 wherein:
the network is a wireless network operated by the network operator; and
the user uses a mobile station within the wireless network to receive the content at the second location.

111. A method in accordance with claim 51 wherein:
the network is a wireless network operated by the network operator; and
the user uses a mobile station within the wireless network to receive the content at the second location.

112. A method in accordance with claim 52 wherein:
the network is a wireless network operated by the network operator; and
the user uses the mobile station within the wireless network to receive the content at the second location.

113. A method in accordance with claim 53 wherein:
the network is a wireless network operated by the network operator; and
the user uses a mobile station within the wireless network to receive the content at the second location.

114. A method in accordance with claim 54 wherein:
the network is a wireless network operated by the network operator; and
the user uses the mobile station within the wireless network to receive the content at the second location.

115. A method in accordance with claim 55 wherein:
the network is a wireless network operated by the network operator; and
the user uses a mobile station within the wireless network to receive the content at the second location.

116. A method in accordance with claim 56 wherein:
the network is a wireless network operated by the network operator; and
the user uses the mobile station within the wireless network to receive the content at the second location.

117. A method in accordance with claim 57 wherein:
the network is a wireless network operated by the network operator; and
the user uses a mobile station within the wireless network to receive the content at the second location.

118. A method in accordance with claim 58 wherein:
the network is a wireless network operated by the network operator; and
the user uses the mobile station within the wireless network to receive the content at the second location.

119. A method in accordance with claim 59 wherein:
the network is a wireless network operated by the network operator; and
the user uses a mobile station within the wireless network to receive the content at the second location.

120. A method in accordance with claim 60 wherein:
the network is a wireless network operated by the network operator; and
the user uses a mobile station within the wireless network to receive the content at the second location.

\* \* \* \* \*